(12) United States Patent
Moon et al.

(10) Patent No.: US 8,223,857 B2
(45) Date of Patent: Jul. 17, 2012

(54) METHOD OF COMMUNICATION USING FRAME

(75) Inventors: Sungho Moon, Anyang-si (KR); Minseok Noh, Anyang-si (KR); Yeong Hyeon Kwon, Anyang-si (KR); Jin Sam Kwak, Anyang-si (KR); Dong Cheol Kim, Anyang-si (KR); Seung Hee Han, Anyang-si (KR); Hyun Woo Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 723 days.

(21) Appl. No.: 12/372,507

(22) Filed: Feb. 17, 2009

(65) Prior Publication Data

US 2009/0225881 A1 Sep. 10, 2009

Related U.S. Application Data

(60) Provisional application No. 61/029,372, filed on Feb. 17, 2008, provisional application No. 61/029,573, filed on Feb. 19, 2008, provisional application No. 61/037,694, filed on Mar. 18, 2008, provisional application No. 61/118,443, filed on Nov. 27, 2008, provisional application No. 61/118,444, filed on Nov. 27, 2008, provisional application No. 61/140,055, filed on Dec. 22, 2008, provisional application No. 61/141,660, filed on Dec. 30, 2008.

(30) Foreign Application Priority Data

Jun. 19, 2008 (KR) .......................... 10-2008-0057869
Jun. 23, 2008 (KR) .......................... 10-2008-0058814

(51) Int. Cl.
*H04L 27/28* (2006.01)

(52) U.S. Cl. ..................................................... 375/260
(58) Field of Classification Search ................. 375/260; 370/280, 294, 314, 321, 474, 476
See application file for complete search history.

(56) References Cited

U.S. PATENT DOCUMENTS

| | | | |
|---|---|---|---|
| 2005/0208945 | A1 | 9/2005 | Hong et al. |
| 2005/0259629 | A1 | 11/2005 | Oliver et al. |
| 2007/0058595 | A1 | 3/2007 | Classon et al. |
| 2007/0070944 | A1 | 3/2007 | Rinne et al. |

(Continued)

FOREIGN PATENT DOCUMENTS

KR 10-0821843 B1 5/2006

(Continued)

OTHER PUBLICATIONS

Zyren et al., "Overview of the 3GPP Long Term Evolution Physical Layer," Freescale Semiconductor, Jul. 2007, pp. 1-24.

(Continued)

*Primary Examiner* — Don N Vo
(74) *Attorney, Agent, or Firm* — Birch, Stewart, Kolasch & Birch, LLP

(57) ABSTRACT

A device and method for communicating by a mobile communication terminal in communication with a base station. The method according to an embodiment includes exchanging a frame of data with the base station. The frame of data includes a) a plurality of first subframes each having a first number of orthogonal frequency division multiple access (OFDMA) symbols, and b) a plurality of second subframes each having a second number of orthogonal frequency division multiple access (OFDMA) symbols different from the first number. One of the second subframes includes an idle symbol.

10 Claims, 17 Drawing Sheets

U.S. PATENT DOCUMENTS

| | | |
|---|---|---|
| 2007/0268846 A1 | 11/2007 | Proctor, Jr. et al. |
| 2007/0280098 A1 | 12/2007 | Bhatt et al. |
| 2007/0280188 A1 | 12/2007 | Kang et al. |
| 2007/0287449 A1* | 12/2007 | Ju et al. ............ 455/433 |
| 2008/0062914 A1* | 3/2008 | Olfat .................. 370/321 |
| 2008/0075032 A1* | 3/2008 | Balachandran et al. ...... 370/317 |
| 2008/0095195 A1 | 4/2008 | Ahmadi et al. |
| 2008/0130620 A1 | 6/2008 | Liu et al. |
| 2008/0175215 A1 | 7/2008 | Oh et al. |
| 2008/0182543 A1 | 7/2008 | Yang et al. |
| 2008/0212692 A1 | 9/2008 | Banerjea et al. |
| 2009/0059845 A1 | 3/2009 | Cooper et al. |
| 2009/0109890 A1 | 4/2009 | Chow et al. |
| 2009/0122777 A1 | 5/2009 | Tao et al. |
| 2009/0185483 A1 | 7/2009 | McBreath et al. |
| 2011/0116485 A1 | 5/2011 | Olszewski et al. |

FOREIGN PATENT DOCUMENTS

| | | |
|---|---|---|
| KR | 10-2006-0061013 A | 6/2006 |
| KR | 10-2007-0040151 A | 4/2007 |
| WO | WO-2006/000988 A1 | 1/2006 |
| WO | WO-2006/107135 A1 | 10/2006 |

OTHER PUBLICATIONS

Zhuang et al., "Ranging Improvement for 802.16e OFDMA PHY," IEEE C802.16e-04/143r1 Broadband Wireless Working Group, Jul. 7, 2004, pp. 1-42.

* cited by examiner

METHOD OF COMMUNICATION USING FRAME

CROSS-REFERENCE TO RELATED APPLICATIONS

This application claims the benefit of priority of U.S. Provisional application Ser. No. 61/029,372 filed on Feb. 17, 2008, U.S. Provisional application Ser. No. 61/029,573 filed on Feb. 19, 2008, U.S. Provisional application Ser. No. 61/037,694 filed on Mar. 18, 2008, U.S. Provisional application Ser. No. 61/118,443 filed on Nov. 27, 2008, U.S. Provisional application Ser. No. 61/118,444 filed on Nov. 27, 2008, U.S. Provisional application Ser. No. 61/140,055 filed on Dec. 22, 2008, U.S. Provisional application Ser. No. 61/141,660 filed on Dec. 30, 2008, Korean Patent Application No. 2008-0057869 filed on Jun. 19, 2008, and Korean Patent Application No. 2008-0058814 filed on Jun. 23, 2008, which are incorporated by reference in their entirety herein.

BACKGROUND

1. Technical Field

The present invention relates to wireless communications, and more particularly, to a method of communication using a frame in a wireless communication system.

2. Related Art

The Institute of Electrical and Electronics Engineers (IEEE) 802.16 standard, incorporated herein by reference, provides a technique and protocol for supporting broadband wireless access. The standardization had been conducted since 1999 until the IEEE 802.16-2001 (incorporated herein by reference) was approved in 2001. The IEEE 802.16-2001 is based on a physical layer of a single carrier (SC) called 'WirelessMAN-SC'. The IEEE 802.16a standard (incorporated herein by reference) was approved in 2003. In the IEEE 802.16a standard, 'WirelessMAN-OFDM' and 'WirelessMAN-OFDMA' are further added to the physical layer in addition to the 'WirelessMAN-SC'. After completion of the IEEE 802.16a standard, the revised IEEE 802.16-2004 standard (incorporated herein by reference) was approved in 2004. To correct bugs and errors of the IEEE 802.16-2004 standard, the IEEE 802.16-2004/Cor1 (hereinafter, IEEE 802.16e) was completed in 2005 in a format of 'corrigendum' (incorporated herein by reference).

Recently, standardization on the IEEE 802.16m is in progress as a new technical standard based on the IEEE 802.16e (incorporated herein by reference). The IEEE 802.16m (incorporated herein by reference), which is a newly developed technical standard, has to be designed to support the previously designed IEEE 802.16e. That is, a technology (i.e., IEEE 802.16m) of a newly designed system has to be configured to operate by effectively incorporating a conventional technology (i.e., IEEE 802.16e). This is called backward compatibility. The backward compatibility considered in the design of IEEE 802.16m is as follows.

First, a user equipment (UE) employing a new technology has to operate with the same performance as a base station (BS) (or a UE) employing a conventional technology. Hereinafter, for simplicity, any system (e.g., UE, BS, etc.) employing the new technology is referred to as a new system, and any system (e.g., UE, BS, etc.) employing the conventional technology is referred to as a legacy system. Second, the new system has to operate in the same radio frequency (RF) subcarrier and the same bandwidth as those of the legacy system. Third, the new BS has to support a case where the new UE and the legacy UE coexist in the same RF subcarrier, and overall system performance has to be improved by a ratio of the new UE. Fourth, the new BS has to support a handover of the legacy UE and a handover of the new UE such that their handover performances conform to those of legacy BSs. Fifth, the new BS has to support both the new UE and the legacy UE to the same level as that supported by the legacy BS to the legacy UE.

The new BS performs scheduling on radio resources to be allocated to the legacy UE or the new UE within a bandwidth that can be supported by the new BS. Scheduling of the radio resources can be performed in a logical frame consisting of a plurality of orthogonal frequency division multiplexing (OFDM) symbols in a time domain and a plurality of subchannels in a frequency domain. Therefore, there is ongoing research on a frame structure in which the IEEE 802.16m system can support backward compatibility with the IEEE 802.16e system.

In particular, in a case where time division duplexing (TDD)-type frame structures having different cyclic prefix (CP) lengths coexist in neighbor cells, a boundary between downlink and uplink regions may overlap, which may result in mutual interference. Accordingly, there is a need to design a TDD frame structure capable of preventing interference between the TDD frame structures coexisting in the adjacent cells.

In addition, although a system profile based on the conventional IEEE 802.16 standard supports only a TDD scheme, there is an attempt to also support a frequency division duplexing (FDD) scheme in which uplink transmission and downlink transmission are performed in different frequency bands. Accordingly, for convenience of system design and hardware sharing, there is a need to design an FDD frame structure having a common feature with the TDD frame structure.

SUMMARY

The present invention provides a time division duplexing (TDD) frame having various cyclic prefix (CP) lengths to mitigate interference between uplink and downlink transmissions.

The present invention also provides a method for transmitting a frequency division duplexing (FDD) frame having a common feature with the TDD frame.

In an aspect of the invention, there is a method of communicating by a mobile communication terminal in communication with a base station. The method includes exchanging a frame of data with the base station, the frame of data including a) a plurality of first subframes each having a first number of orthogonal frequency division multiple access (OFDMA) symbols, and b) a plurality of second subframes each having a second number of orthogonal frequency division multiple access (OFDMA) symbols different from the first number. One of the second subframes includes an idle symbol.

The step of exchanging a frame of data with the base station may include at least one of transmitting the frame of data to the base station and receiving the frame of data from the base station.

The step of exchanging a frame of data with the base station may include exchanging the frame via a channel having a bandwidth of one of 5, 10 and 20 Mhz.

The step of exchanging a frame of data with the base station may include forming the frame from data received from a data buffer within the mobile communication terminal.

The step of exchanging a frame of data with the base station may include decomposing the frame into data to be stored in a data buffer within the mobile communication terminal.

A number of the plurality of first subframes and a number of the plurality of second subframes may be predetermined, or may be determined based upon an instruction received from the base station.

The frame may have a cyclic prefix (CP) length of $1/16$ useful symbol time (Tu).

The first number of OFDMA symbols may be seven symbols and the second number of OFDMA symbols may be 6 symbols.

The step of exchanging may include time division duplexing (TDD) the frame with another frame.

The plurality of first subframes may include 2 first subframes and the plurality of second subframes may include 6 second subframes.

The frame may include one first subframe followed by 6 second subframes followed by another first subframe.

A $4^{th}$ of the six second subframes may include the idle symbol.

The idle symbol may be a sixth symbol of the $4^{th}$ second subframe.

The frame may include a plurality of downlink subframes followed by a plurality of uplink subframes.

The plurality of downlink subframes may include at least one of the plurality of first subframes and at least one of the plurality of second subframes, and the plurality of uplink subframes may include at least one other of the plurality of first subframes and at least one other of the plurality of second subframes.

A ratio between the plurality of uplink subframes and the plurality of downlink subframes may be one of 4:4, 6:2, 7:1, and 5:3.

The frame may include a transmit/receive transition gap (TTG) between the plurality of uplink subframes and the plurality of downlink subframes.

The step of exchanging may include frequency division duplexing (FDD) the frame with another frame.

The plurality of first subframes may include 3 first subframes and the plurality of second subframes may include 5 second subframes.

The frame may include one first subframe followed by 3 second subframes followed by a second first subframe followed by 2 second subframes followed by a third first subframe.

In another aspect of the invention, there is a mobile communication terminal configured to communicate with a base station. The mobile communication terminal includes a display; a transceiver; and a processor operatively connected to the display and transceiver, the processor configured to exchange a frame of data with the base station. The frame of data includes a) a plurality of first subframes each having a first number of orthogonal frequency division multiple access (OFDMA) symbols, and b) a plurality of second subframes each having a second number of orthogonal frequency division multiple access (OFDMA) symbols different from the first number. One of the second subframes includes an idle symbol

DESCRIPTION OF EXEMPLARY EMBODIMENTS

Figure 1:
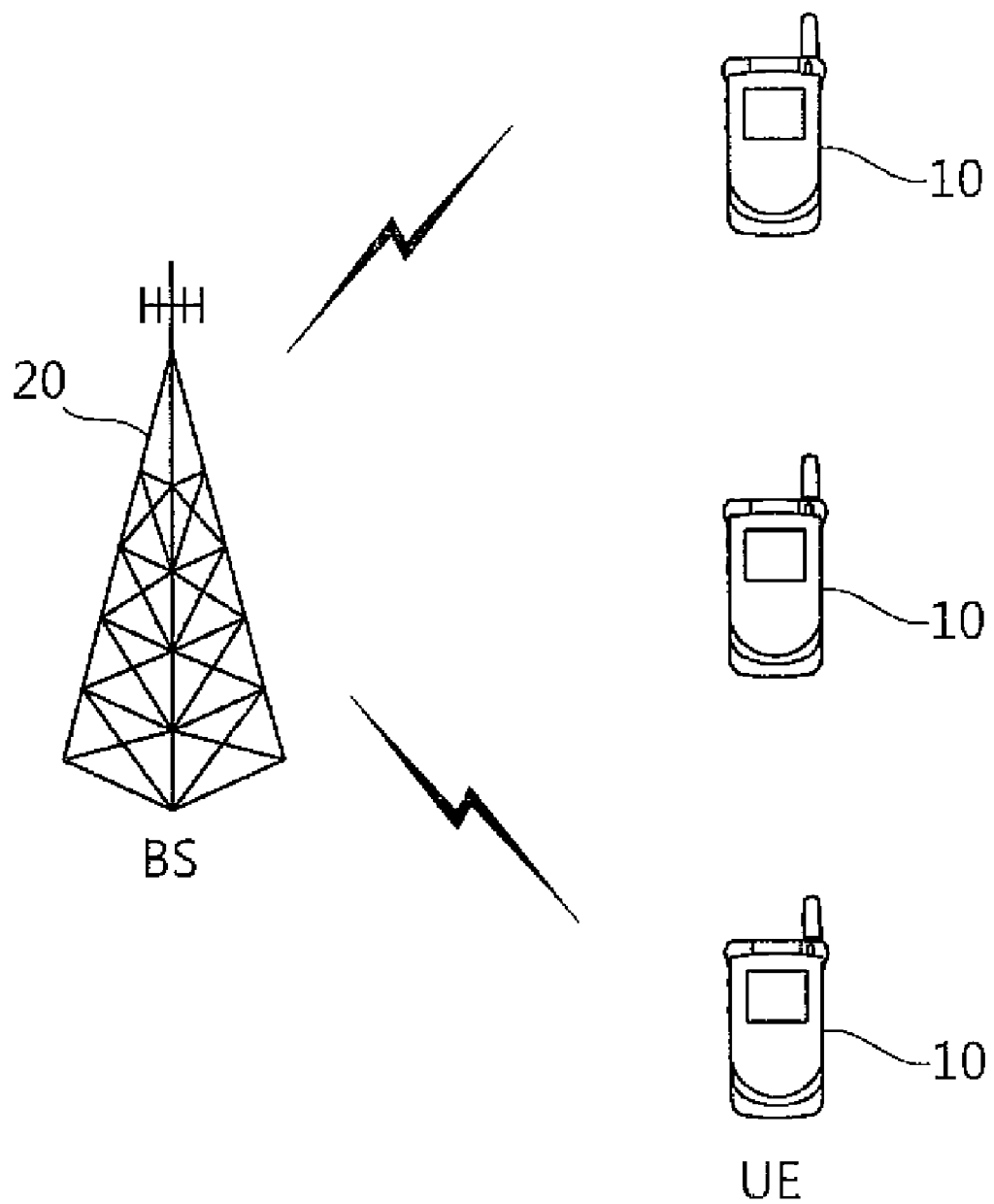
FIG. 1 shows a wireless communication system.

FIG. 1 shows a wireless communication system. The wireless communication system can be widely deployed to provide a variety of communication services, such as voices, packet data, etc.

Referring to FIG. 1, the wireless communication system includes a base station (BS) 20 and at least one user equipment (UE) 10. The UE 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as a node-B, a base transceiver system (BTS), an access point, etc. There are one or more cells within the coverage of the BS 20.

Hereinafter, a downlink denotes a communication link from the BS 20 to the UE 10, and an uplink denotes a communication link from the UE 10 to the BS 20. In downlink, a transmitter may be a part of the BS 20, and a receiver may be a part of the UE 10. In uplink, the transmitter may be a part of the UE 10, and the receiver may be a part of the BS 20.

The wireless communication system may be a system based on orthogonal frequency division multiplexing (OFDM)/orthogonal frequency division multiple access (OFDMA). The OFDM uses a plurality of orthogonal subcarriers. The OFDM uses orthogonality between an inverse fast Fourier transform (IFFT) and a fast Fourier transform (FFT). The transmitter transmits data by performing the IFFT. The receiver restores original data by performing the FFT on a received signal. The transmitter uses the IFFT to combine the plurality of subcarriers. The receiver uses the FFT to separate the plurality of subcarriers.

Figure 2:
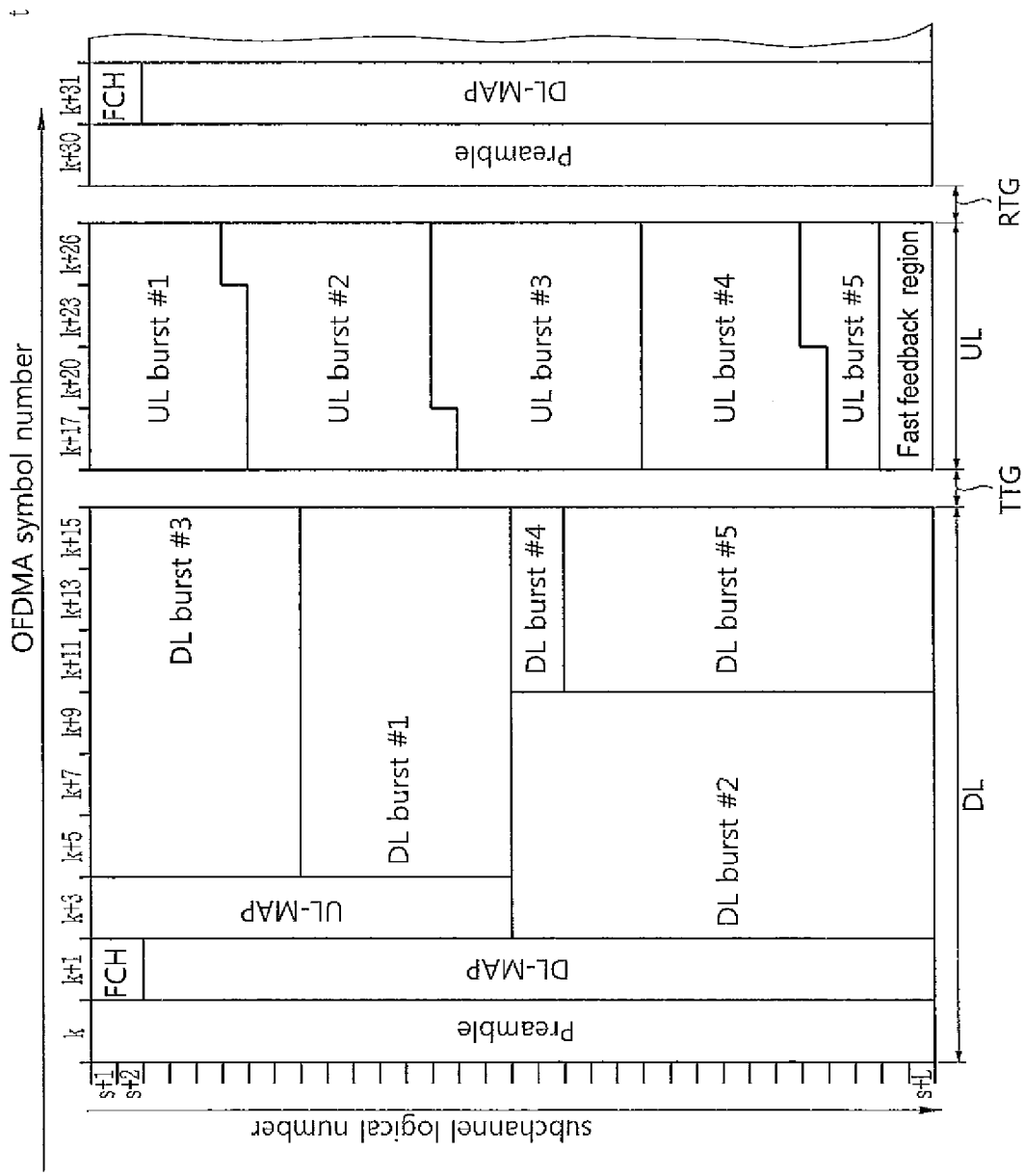
FIG. 2 shows an example of a frame structure.

FIG. 2 shows an example of a frame structure. A frame is a data sequence used according to a physical specification in a fixed time duration. This may be found in section 8.4.4.2 of "part 16: Air Interface for Fixed Broadband Wireless Access Systems" in the institute of electrical and electronics engineers (IEEE) standard 802.16-2004, the entire contents of which is incorporated herein by reference.

Referring to FIG. 2, the frame includes a downlink (DL) frame and an uplink (UL) frame. In a time division duplexing (TDD) scheme, UL and DL transmissions are achieved at different time points but share the same frequency band. The DL frame temporally precedes the UL frame. The DL frame sequentially includes a preamble, a frame control header (FCH), a DL-MAP, a UL-MAP, and a burst region. Guard times are provided to identify the UL frame and the DL frame and are inserted to a middle portion (between the DL frame and the UL frame) and a last portion (next to the UL frame) of the frame. A transmit/receive transition gap (TTG) is a gap between a downlink burst and a subsequent uplink burst. A receive/transmit transition gap (RTG) is a gap between an uplink burst and a subsequent downlink burst.

The preamble is used between a BS and a UE for initial synchronization, cell search, and frequency-offset and channel estimation. The FCH includes information on a length of a DL-MAP message and a coding scheme of the UL-MAP.

The DL-MAP is a region for transmitting the DL-MAP message. The DL-MAP message defines access to a DL channel. The DL-MAP message includes a configuration change count of a downlink channel descriptor (DCD) and a BS identifier (ID). The DCD describes a downlink burst profile applied to a current MAP. The downlink burst profile indicates characteristics of a DL physical channel. The DCD is periodically transmitted by the BS by using a DCD message.

The UL-MAP is a region for transmitting a UL-MAP message. The UL-MAP message defines access to a UL channel. The UL-MAP message includes a configuration change count of an uplink channel descriptor (UCD) and also includes an effective start time of uplink allocation defined by the UL-MAP. The UCD describes an uplink burst profile. The uplink burst profile indicates characteristics of a UL physical channel and is periodically transmitted by the BS by using a UCD message.

Figure 3:
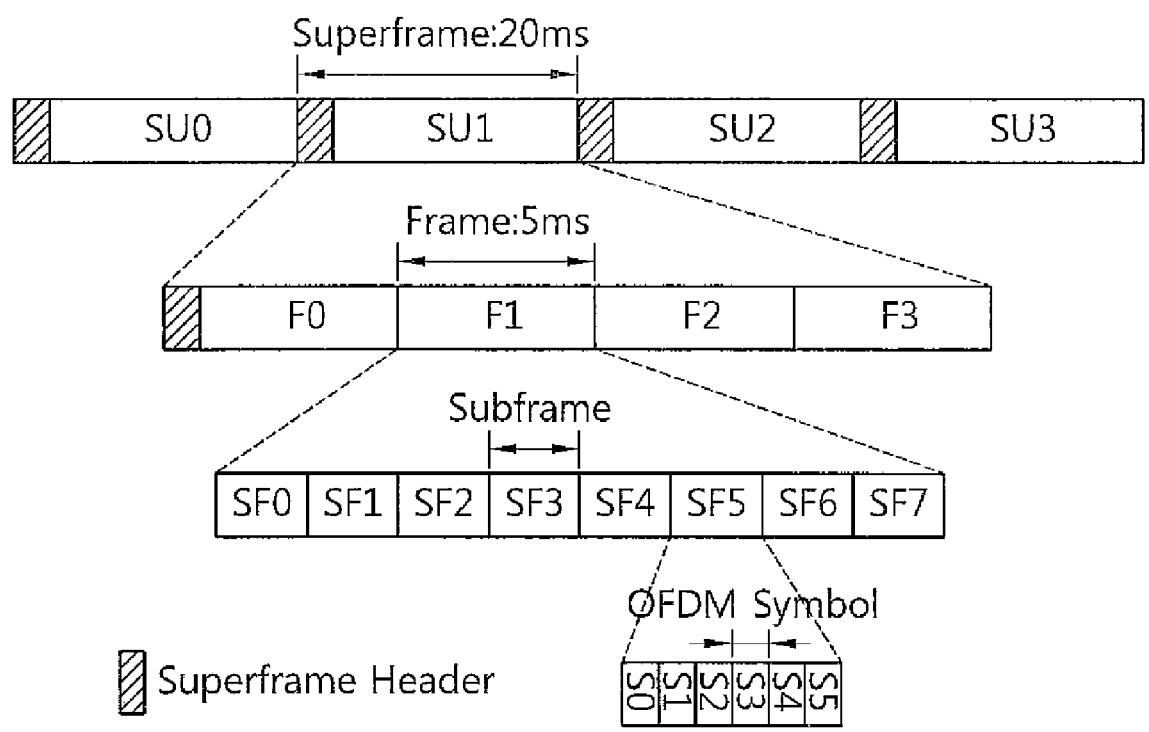
FIG. 3 shows an example of a frame hierarchy.

FIG. 3 shows an example of a frame hierarchy.

Referring to FIG. 3, a superframe is divided into four radio frames (hereinafter, frames) each having the same size. The superframe may include a superframe header. The superframe header may be assigned to a first frame among a plurality of frames constituting the superframe. A common control channel may be allocated to the superframe header. The common control channel is used to transmit information regarding the frames constituting the superframe or control information (e.g., system information) that can be commonly used by all UEs. The system information is necessary information which must be known to perform communication between a UE and a BS. The BS periodically transmits the system information. The system information may be periodically transmitted in every 20 to 40 milliseconds (ms). A size of the superframe can be determined by considering a transmission period of the system information. Although a size of each superframe is 20 ms and a size of each frame is 5 ms in FIG. 3, this is for exemplary purposes only, and thus the present invention is not limited thereto.

One frame consists of 8 subframes. One subframe can be allocated for uplink or downlink transmission. Each subframe for downlink transmission may include a signal for resource allocation. For example, the subframe may include 6 OFDM symbols. This is for exemplary purposes only, and thus the present invention is not limited thereto.

Now, a TDD frame structure and an FDD frame structure satisfying backward compatibility with a legacy system will be described. A TDD frame is a frame in which the entire frequency band is used for uplink or downlink transmission. Uplink and downlink regions are separated in a time domain. An FDD frame is a frame in which the uplink transmission and the downlink transmission occupy different frequency bands and are simultaneously achieved. A dual frame is a frame that satisfies backward compatibility with the legacy system. The dual frame includes a resource region that supports the legacy system and a resource region that supports a new/evolved system. The legacy system may be the institute of electrical and electronics engineers (IEEE) 802.16e system. The new system may be the IEEE 802.16m system. The terms used in the IEEE 802.16e frame structure described in FIG. 2 may be equally defined in the IEEE 802.16m frame structure without modification or with minor modifications.

Table 1 below shows frame parameters.

TABLE 1

| | Transmission Bandwidth (MHz) | | |
| --- | --- | --- | --- |
| | 5 | 10 | 20 |
| Over Sampling Factor | | $28/25$ | |
| Sampling Frequency(MHz) | 5.6 | 11.2 | 22.4 |
| FFT Size | 512 | 1024 | 2048 |
| Subcarrier Spacing(KHz) | | 10.94 | |
| OFDM Symbol Time, $T_u(\mu s)$ | | 91.4 | |

| Cyclic Prefix(CP) | $T_s(\mu s)$ | OFDM Symbols per Frame | Idle Time($\mu s$) |
| --- | --- | --- | --- |
| no legacy support $T_g = 1/4 T_u$ | 91.4 + 22.85 = 114.25 | 43 | 87.25 |

TABLE 1-continued

| | | | |
|---|---|---|---|
| legacy support Tg = ⅛Tu | 91.4 + 11.42 = 102.82 | 48 | 64.64 |
| no legacy support Tg= 1/16Tu | 91.4 + 5.71 = 97.11 | 51 | 47.39 |
| no legacy support Tg = 1/32Tu | 91.4 + 2.86 = 94.26 | 53 | 4.22 |

To satisfy backward compatibility with the frame of the legacy system (i.e., IEEE 802.16e system), parameters (e.g., a transmission bandwidth, a sampling frequency, an FFT size, a subcarrier spacing, etc.) of the new system may conform to IEEE 802.16e frame parameters. In a conventional legacy system mode supporting IEEE 802.16e, a cyclic prefix (CP) length can be set to ⅛ useful symbol time (Tu) and one frame can include 48 OFDM symbols. In a conventional legacy support disabled mode not supporting the legacy system, new CP lengths can be set to ¼ Tu, 1/16 Tu, and 1/32 Tu and one frame can include 43, 51, and 53 OFDM symbols respectively for the new CP lengths. For example, when one subframe consists of 6 OFDM symbols, a frame with a CP length of ¼ Tu may consist of 7 subframes and one residual OFDM symbol, a frame with a CP length of 1/16 Tu may consist of 8 subframes and three residual OFDM symbols, and a frame with a CP length of 1/32 Tu may consist of 8 subframes and 5 residual OFDM symbols.

A CP is a copy of a final useful symbol period Tg, and can be expressed by a ratio with respect to a useful symbol time (Tu).

Table 2 below shows lengths of a TTG and an RTG in a TDD structure according to the IEEE 802.16e standard. The TTG can be expressed hereinafter in other terms such as a switching point, an idle frame, etc. This is for exemplary purposes only, and thus the present invention is not limited thereto. The switching points of the new system may be a longer or shorter than those in the IEEE 802.16e standard.

media access control (MAC) and physical (PHY) entities. When one subframe is constructed of 6 OFDM symbols, a DT/UL ratio can be effectively configured, the number of OFDM symbols in a UL duration can be set to a multiple of 3 in a dual frame, and data delay capability can be improved. However, the number of OFDM symbols constituting one subframe is not limited thereto.

A TTG is located between a DL region and a UL region. An RTG is located between the UL region and a subsequent frame. An idle time may be included in the TTG or the RTG according to a CP length.

Figure 4:
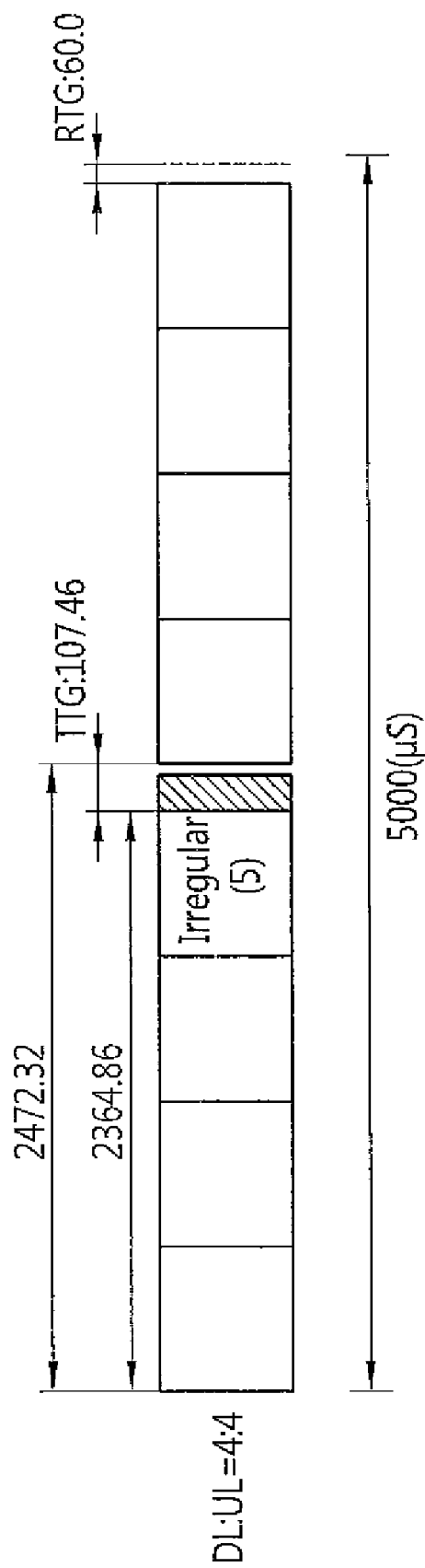
FIG. 4 shows an example of a conventional time division duplexing (TDD) frame structure having a cyclic prefix (CP) length of $1/8$ useful symbol time (Tu) when a downlink-to-uplink ratio (DL/UL ratio) is 4:4.

Specifically, referring to FIG. 4, a DL duration is a time period between a start point of a frame and a time point of 2364.86 microseconds (μs), and includes 23 OFDM symbols with a CP length of ⅛ Tu. A TTG duration is a time period between the time point of 2364.86 μs and a time point of 2472.32 μs, and thus includes a time period of 107.46 μs corresponding to a portion of the idle time and the TTG duration of Table. 2. A UL duration is a time period between the time point of 2472.32 μs and a time point of 4940 μs, and includes 24 OFDM symbols with a CP length of ⅛ Tu. An RTG duration is a time period between the time point of 4940 μs and an end point of the frame, and thus includes a time period of 60 μs corresponding to the RTG duration of Table 2.

Figure 5:
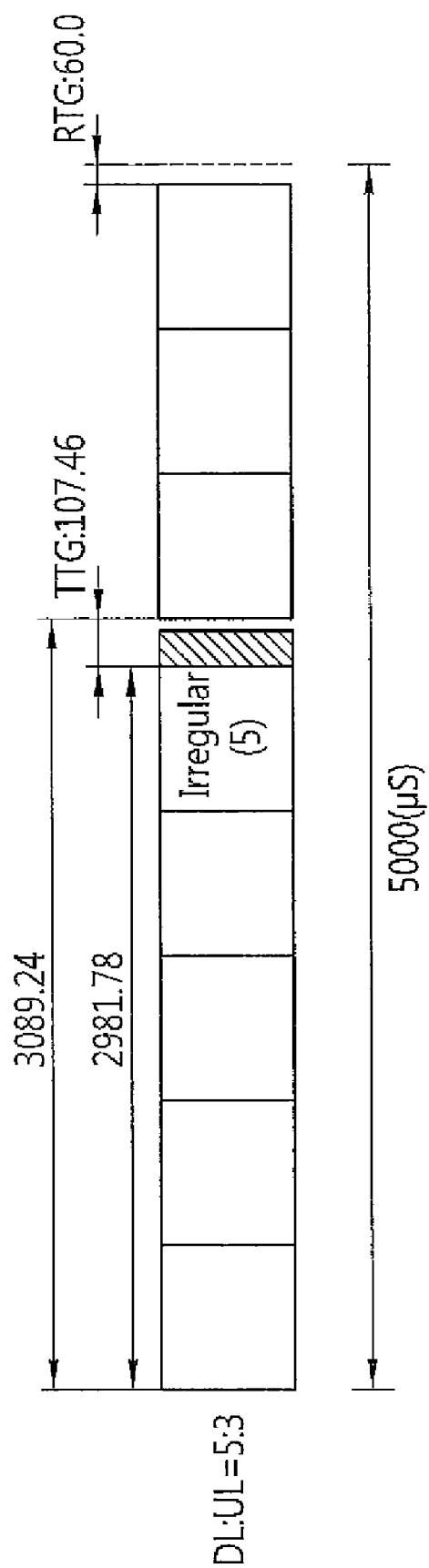
FIG. 5 shows an example of a conventional TDD frame structure having a CP length of $1/8$ Tu when a DL/UL ratio is 5:3.

Referring to FIG. 5, a DL duration is a time period between a start point of a frame and a time point of 2981.78 μs, and includes 29 OFDM symbols with a CP length of ⅛ Tu. A TTG duration is a time period between the time point of 2981.78 μs

TABLE 2

| Bandwidth | 5M | 10M | 8.75M | 7M | 14M |
|---|---|---|---|---|---|
| PS(ns) (=4/Fs) | 714.286 | 357.142 | 400 | 500 | 250 |
| TTG(μs) | 148 PS = 105.71 | 296 PS = 105.71 | 218 PS = 87.2 | 376 PS = 183 | 752 PS = 188 |
| RTG(μs) | 84 PS = 60.00 | 168 PS = 60.00 | 186 PS = 74.4 | 120 PS = 60 | 240 PS = 60 |
| TTG:RTG | 1.76:1 | 1.76:1 | 1.17:1 | 3.13:1 | 3.13:1 |

Figure 6:
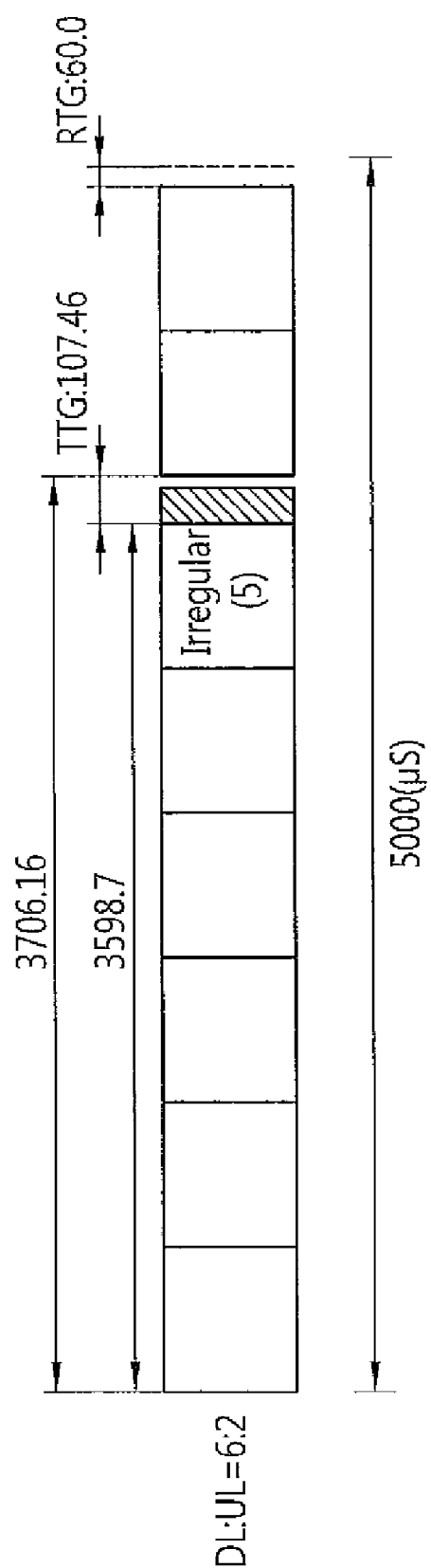
FIG. 6 shows an example of a conventional TDD frame structure having a CP length of $1/8$ Tu when a DL/UL ratio is 6:2.
Figure 7:
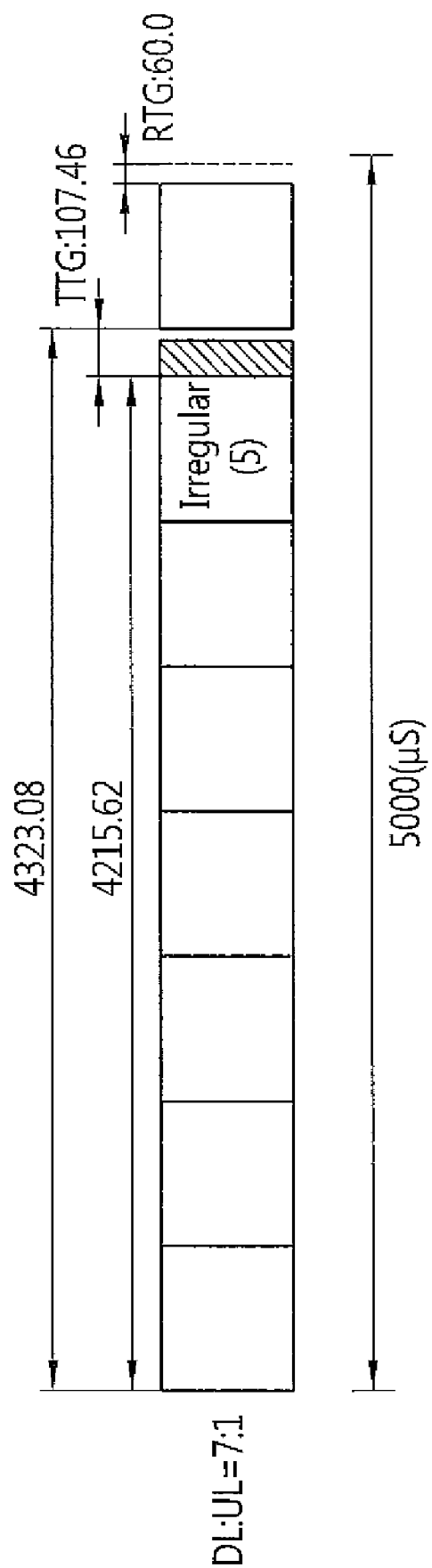
FIG. 7 shows an example of a conventional TDD frame structure having a CP length of $1/8$ Tu when a DL/UL ratio is 7:1.

FIG. 4 to FIG. 7 show examples of a TDD frame structure having a CP length of ⅛ Tu when a downlink-to-uplink ratio (DL/UL ratio) is 4:4 (FIG. 4), 5:3 (FIG. 5), 6:2 (FIG. 6), or 7:1 (FIG. 7).

Referring to FIG. 4 to FIG. 7, a new TDD frame satisfying backward compatibility is based on the conventional TDD frame structure and based on the aforementioned parameters and values of Table 1 and Table 2 above. That is, the new TDD frame has a length of 5 ms, a CP length of ⅛ Tu, and a bandwidth of 10 megahertz (MHz). Further, the new TDD frame includes 48 OFDM symbols. In addition, basic control information (e.g., preamble, FCH, and MAP) can be defined according to the IEEE 802.16e standard. The TTG length and the RTG length are the same as shown in Table 2 above.

In FIG. 4 to FIG. 7, one TDD frame consists of 8 subframes. A subframe is a basic unit of data allocation and scheduling, and generally consists of 6 OFDM symbols. Herein, the number 6 is determined by considering a bandwidth in a time axis and a pilot allocation pattern. In this case, a radio channel property is considered together with a size of data which is allocated through coding and modulation of and a time point of 3089.24 μs, and thus includes a time period of 107.46 μs corresponding to a portion of the idle time and the TTG duration of Table. 2. A UL duration is a time period between the time point of 3089.24 μs and a time point of 4940 μs, and includes 18 OFDM symbols with a CP length of ⅛ Tu. An RTG duration is a time period between the time point of 4940 μs and an end point of the frame, and thus includes a time period of 60 μs corresponding to the RTG duration of Table 2.

Referring to FIG. 6, a DL duration is a time period between a start point of a frame and a time point of 3598.7 μs, and includes 35 OFDM symbols with a CP length of ⅛ Tu. A TTG duration is a time period between the time point of 3598.7 μs and a time point of 3706.16 μs, and thus includes a time period of 107.46 μs corresponding to a portion of the idle time and the TTG duration of Table. 2. A UL duration is a time period between the time point of 3706.16 μs and a time point of 4940 μs, and includes 12 OFDM symbols with a CP length of ⅛ Tu. An RTG duration is a time period between the time point of 4940 μs and an end point of the frame, and thus includes a time period of 60 μs corresponding to the RTG duration of Table 2.

Referring to FIG. 7, a DL duration is a time period between a start point of a frame and a time point of 4215.62 μs, and includes 41 OFDM symbols with a CP length of ⅛ Tu. A TTG duration is a time period between the time point of 4215.62 μs and a time point of 4323.08 μs, and thus includes a time period of 107.46 μs corresponding to a portion of the idle time and the TTG duration of Table. 2. A UL duration is a time period between the time point of 4323.08 μs and a time point of 4940 μs, and includes 6 OFDM symbols with a CP length of ⅛ Tu. An RTG duration is a time period between the time point of 4940 μs and an end point of the frame, and thus includes a time period of 60 μs corresponding to the RTG duration of Table 2.

In FIG. 4 to FIG. 7, the RTG is set to 60.0 μs, and the TTG is set to 107.46 μs by allowing most of idle time to belong to the TTG. However, as shown in Table 2 above, it is also possible to set the TTG to 105.71 μs and the RTG to 61.77 μs by allowing most of idle time to belong to the RTG.

Figure 8:
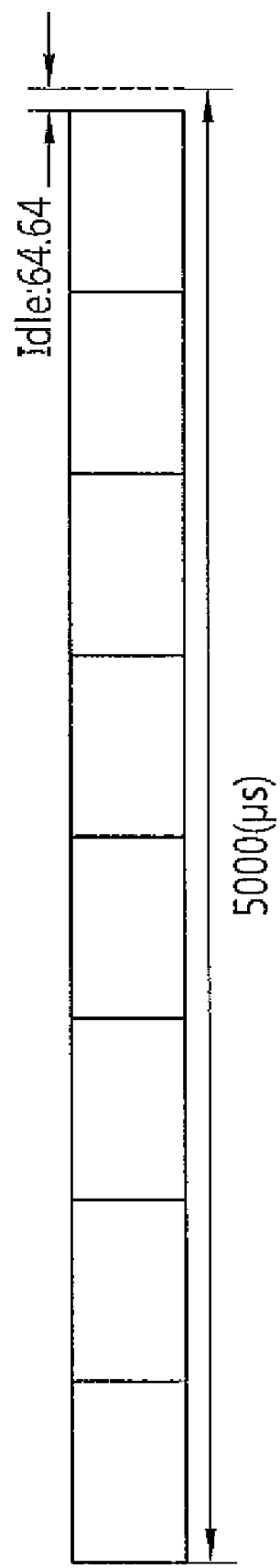
FIG. 8 shows an example of a conventional frequency division duplexing (FDD) frame structure having a CP length of $1/8$ Tu.

FIG. 8 shows an example of an FDD frame structure having a CP length of ⅛ Tu.

Referring to FIG. 8, 48 OFDM symbols are included in one frame when a total frame length is 5 ms. One frame consists of 8 subframes. One subframe consists of 6 OFDM symbols. The idle time at the end of the frame is 64.64 μs as shown in Table 1 above.

The TDD and FDD frame structures shown in FIG. 4 to FIG. 8 have a CP length of ⅛ Tu. However, when a TDD frame structure having a different CP length coexists in an adjacent cell, mutual interference from mis-alignment between DL and UL transmissions may occur in data transmission. The present invention provides a TDD frame structure, in which TDD frames have various CP lengths to prevent mutual interference with a TDD frame having a CP length of ⅛ Tu, and also provides an FDD frame structure having a common feature with the TDD frame structure.

<Frame Structure In Which Switching Points Overlap Between Frames having Different CP Lengths>

Figure 9:
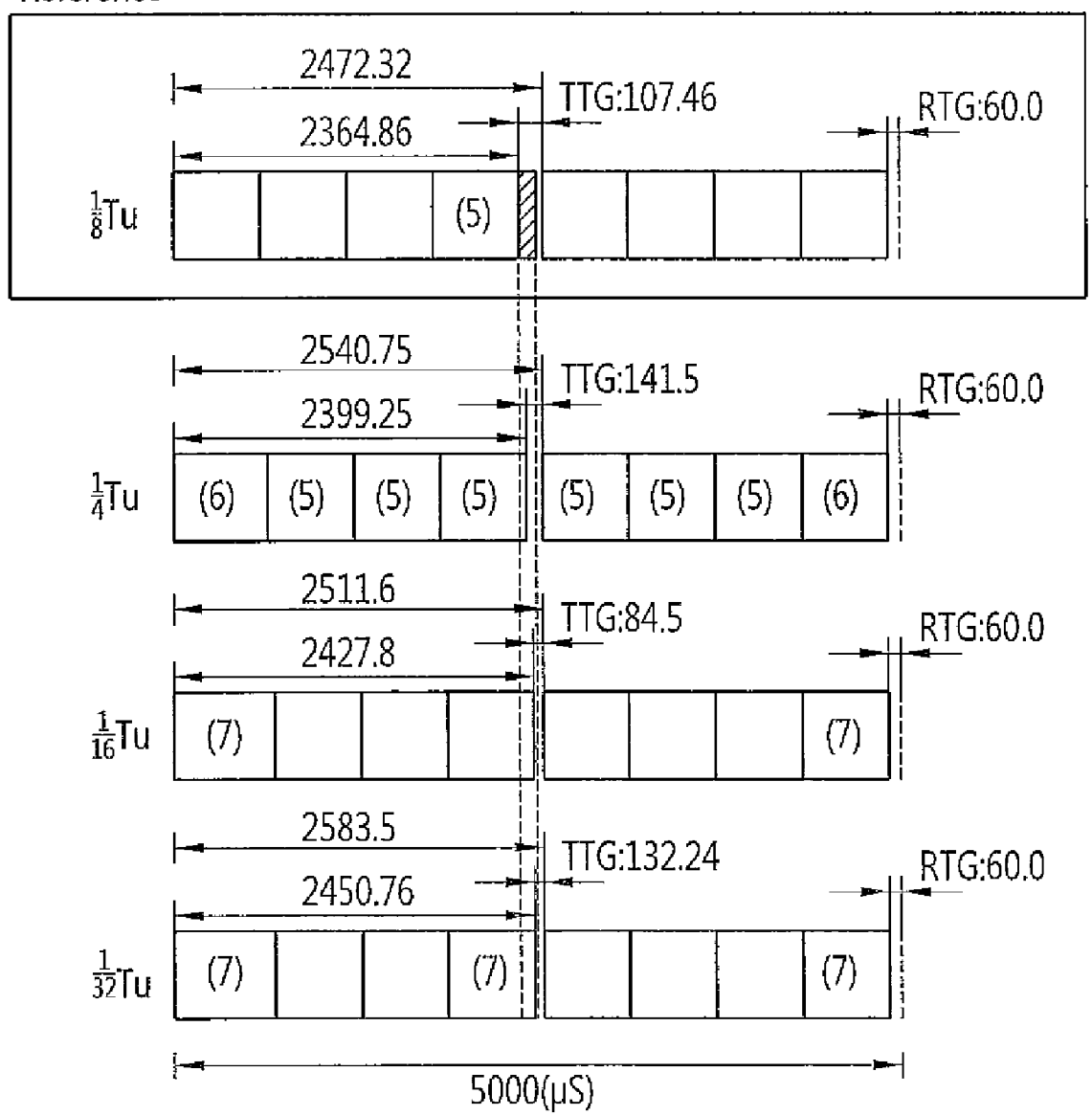
FIG. 9 shows TDD frame structures having a CP length of $1/4$ Tu, $1/16$ Tu, or $1/32$ Tu with a CP length of $1/8$ Tu and when a DL/UL ratio is 4:4 according to an embodiment of the present invention.

FIG. 9 shows a TDD frame structure having a CP length of ¼ Tu, 1/16 Tu, or 1/32 Tu when a DL/UL ratio is 4:4 according to an embodiment of the present invention.

Referring to FIG. 9, a reference frame has the same conventional structure of FIG. 4. That is, the frame has a total length of 5 ms and a CP length of ⅛ Tu, and includes 8 subframes.

In a first TDD frame structure of this embodiment, a CP length is ¼ Tu. A total frame length is 5 ms. A DL duration is a time period between a start point of a frame and a time point of 2399.25 μs, and includes 21 OFDM symbols with a CP length of ¼ Tu. A TTG duration is a time period between the time point of 2399.25 μs and a time point of 2540.75 μs, and thus includes a time period of 141.5 μs corresponding to a portion of the idle time and the TTG duration of Table. 2. A UL duration is a time period between the time point of 2540.75 μs and a time point of 4940 μs, and includes 21 OFDM symbols with a CP length of ¼ Tu. An RTG duration is a time period between the time point of 4940 μs and an end point of the frame, and thus includes a time period of 60 μs corresponding to the RTG duration of Table 2. The time points may be varied according to the TTG and RTG durations. Accordingly, if one subframe is constructed of 5 OFDM symbols, one residual OFDM symbol is further allocated to the DL duration, one residual OFDM symbol is further allocated to the UL duration, and the remaining one residual OFDM symbol is allocated between the TTG and RTG durations. In other words, the last DL subframe is constructed of 6 OFDM symbols in FDD, and the last symbol in this subframe is punctured and is converted to a subframe of 5 OFDM symbols in TDD due to the TTG duration. In the first TDD frame structure of FIG. 9, a first subframe of the DL duration and a last subframe of the UL duration are constructed of 6 OFDM symbols. However, any one subframe belonging to the DL duration can be constructed of 6 OFDM symbols instead of the first subframe, and any one subframe belonging to the UL duration can be constructed of 6 OFDM symbols instead of the last subframe. In addition, the DL duration can be constructed of a plurality of subframes consisting of 5 OFDM symbols and the remaining one independent OFDM symbol, and the UL duration can be constructed of a plurality of subframes consisting of 5 OFDM symbols and the remaining one independent OFDM symbol. Such a subframe structure is for exemplary purposes only. That is, the subframes belonging to the DL duration can be constructed of any number of OFDM symbols, and the subframes belonging to the UL duration can be constructed of any number of OFDM symbols, wherein the subframes can have different sizes.

In a second TDD frame structure of this embodiment, a CP length is 1/16 Tu. A total frame length is 5 ms. A DL duration is a time period between a start point of a frame and a time point of 2427.8 μs, and includes 25 OFDM symbols with a CP length of 1/16 Tu. A TTG duration is a time period between the time point of 2427.8 μs and a time point of 2511.6 μs, and thus includes a time period of 84.5 μs corresponding to a portion of the idle time and the TTG duration of Table. 2. A UL duration is a time period between the time point of 2511.6 μs and a time point of 4940 μs, and includes 25 OFDM symbols with a CP length of 1/16 Tu. An RTG duration is a time period between the time point of 4940 μs and an end point of the frame, and thus includes a time period of 60 μs corresponding to the RTG duration of Table 2. The time points may be varied according to the TTG and RTG durations. Accordingly, if one subframe is constructed of 6 OFDM symbols, three residual OFDM symbols remain. Among the three residual OFDM symbols, one OFDM symbol is further allocated to the DL duration, one OFDM symbol is further allocated to the UL duration, and the remaining one OFDM symbol is allocated between the TTG and RTG durations. In other words, the last DL subframe is constructed of 7 OFDM symbols in FDD, and the last symbol in this subframe is punctured and is converted to a subframe of 6 OFDM symbols in TDD due to the TTG duration. In the second TDD frame structure of FIG. 9, a first subframe of the DL duration is constructed of 7 OFDM symbols and a last subframe of the UL duration is constructed of 7 OFDM symbols. However, any one subframe belonging to the DL duration can be constructed of 7 OFDM symbols instead of the first subframe, and any one subframe belonging to the UL duration can be constructed of 7 OFDM symbols instead of the last subframe. In addition, the DL duration can be constructed of a plurality of subframes consisting of 6 OFDM symbols and the remaining one independent OFDM symbol, and the UL duration can be constructed of a plurality of subframes consisting of 6 OFDM symbols and the remaining one independent OFDM symbol. Such a subframe structure is for exemplary purposes only. That is, the subframes belonging to the DL duration can be constructed of any number of OFDM symbols, and the subframes belonging to the UL duration can be constructed of any number of OFDM symbols, wherein the subframes can have different sizes.

In a third TDD frame structure of this embodiment, a CP length is 1/32 Tu. A total frame length is 5 ms. A DL duration is a time period between a start point of a frame and a time point of 2450.76 μs, and includes 26 OFDM symbols with a CP length of 1/32 Tu. A TTG duration is a time period between the time point of 2450.76 μs and a time point of 2583.5 μs, and thus includes a time period of 132.42 μs corresponding to a portion of the idle time and the TTG duration of Table. 2. A UL duration is a time period between the time point of 2583.5 µs and a time point of 4940 µs, and includes 25 OFDM symbols with a CP length of 1/32 Tu. An RTG duration is a time period between the time point of 4940 µs and an end point of the frame, and thus includes a time period of 60 µs corresponding to the RTG duration of Table 2. The time points may be varied according to the TTG and RTG durations. Accordingly, if one subframe is constructed of 6 OFDM symbols, 5 residual OFDM symbols remain. Among the 5 residual OFDM symbol, two OFDM symbols are further allocated to the DL duration, one OFDM symbol is further allocated to the UL duration, and the remaining two OFDM symbols are allocated between the TTG and RTG durations. In the third TDD frame structure of FIG. 9, a first subframe and a last subframe of the DL duration are constructed of 7 OFDM symbols and a last subframe of the UL duration is constructed of 7 OFDM symbols. However, any two subframes belonging to the DL duration can be constructed of 7 OFDM symbols instead of the first and last DL subframes, and any one subframe belonging to the UL duration can be constructed of 7 OFDM symbols instead of the last UL subframe. In addition, the DL duration can be constructed of a plurality of subframes consisting of 6 OFDM symbols and the remaining two independent OFDM symbols, and the UL duration can be constructed of a plurality of subframes consisting of 6 OFDM symbols and the remaining one independent OFDM symbol. Such a subframe structure is for exemplary purposes only. That is, the subframes belonging to the DL duration can be constructed of any number of OFDM symbols, and the subframes belonging to the UL duration can be constructed of any number of OFDM symbols, wherein the subframes can have different sizes.

When the TDD frame is configured as shown in FIG. 9, mutual interference does not occur even if the frame structures having different CP lengths exist in adjacent cells. That is, mutual interference does not occur because a DL duration of a frame having a CP length of 1/8 Tu does not overlap with a UL duration of a frame having a CP length of 1/4 Tu, 1/16 Tu, or 1/32 Tu, and a UL duration of a frame having a CP length of 1/8 Tu does not overlap with a DL duration of a frame having a CP length of 1/4 Tu, 1/16 Tu, or 1/32 Tu.

Figure 10:
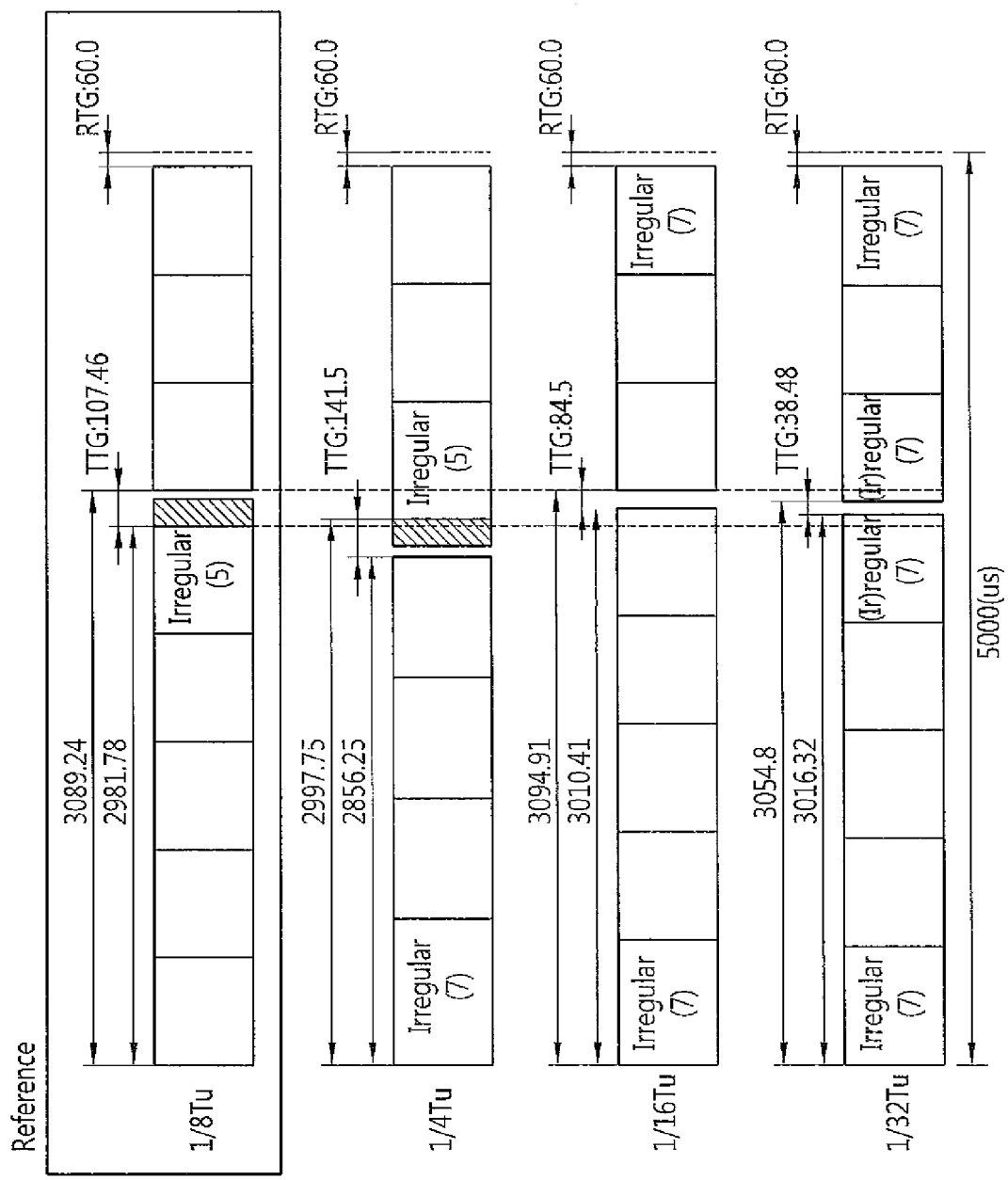
FIG. 10 shows TDD frame structures having a CP length of $1/4$ Tu, $1/16$ Tu, or $1/32$ Tu with a CP length of $1/8$ Tu and when a DL/UL ratio is 5:3 according to an embodiment of the present invention.

FIG. 10 shows TDD frame structures having a CP length of 1/4 Tu, 1/16 Tu, or 1/32 Tu when a DL/UL ratio is 5:3 with a CP length of 1/8 Tu according to an embodiment of the present invention.

Referring to FIG. 10, a reference frame has the same conventional structure of FIG. 5. That is, the frame has a total length of 5 ms and a CP length of 1/8 Tu, and includes 8 subframes.

In a first TDD frame structure of this embodiment, a CP length is 1/4 Tu. A total frame length is 5 ms. A DL duration is a time period between a start point of a frame and a time point of 2856.25 µs, and includes 25 OFDM symbols with a CP length of 1/4 Tu. A TTG duration is a time period between the time point of 2856.25 µs and a time point of 2997.75 µs, and thus includes a time period of 141.5 µs corresponding to a portion of the idle time and the TTG duration of Table. 2. A UL duration is a time period between the time point of 2997.75 µs and a time point of 4940 µs, and includes 17 OFDM symbols with a CP length of 1/4 Tu. An RTG duration is a time period between the time point of 4940 µs and an end point of the frame, and thus includes a time period of 60 µs corresponding to the RTG duration of Table 2. The time points may be varied according to the TTG and RTG durations. Accordingly, if one subframe is constructed of 6 OFDM symbols, one residual OFDM symbol is further allocated to the DL duration, a first subframe of the UL duration is constructed of 5 OFDM symbols, and one OFDM symbol preceding the first subframe of the UL duration is punctured. In the first TDD frame structure of FIG. 10, a first subframe of the DL duration is constructed of 7 OFDM symbols. However, any one subframe belonging to the DL duration can be constructed of 7 OFDM symbols instead of the first subframe. In addition, the DL duration can be constructed of a plurality of subframes consisting of 6 OFDM symbols and the remaining one independent OFDM symbol. Such a subframe structure is for exemplary purposes only. That is, the subframes belonging to the DL duration can be constructed of any number of OFDM symbols, and the subframes belonging to the UL duration can be constructed of any number of OFDM symbols, wherein the subframes can have different sizes.

Alternatively, in the TDD frame structure having a CP length of 1/4 Tu, if one subframe is constructed of 5 OFDM symbols, one residual OFDM symbol can be further allocated to the DL duration, one residual OFDM symbol can be further allocated to the UL duration, and the remaining one residual OFDM symbol can be allocated to the TTG duration. This alternative method is the same as the case of 1/4 Tu, which was explained with a DL to UL ratio of 4:4 in FIG. 9.

In a second TDD frame structure of this embodiment, a CP length is 1/16 Tu. A total frame length is 5 ms. A DL duration is a time period between a start point of a frame and a time point of 3010.41 µs, and includes 31 OFDM symbols with a CP length of 1/16 Tu. A TTG duration is a time period between the time point of 3010.41 µs and a time point of 3094.91 µs, and thus includes a time period of 84.5 µs corresponding to a portion of the idle time and the TTG duration of Table. 2. A UL duration is a time period between the time point of 3094.91 µs and a time point of 4940 µs, and includes 19 OFDM symbols with a CP length of 1/16 Tu. An RTG duration is a time period between the time point of 4940 µs and an end point of the frame, and thus includes a time period of 60 µs corresponding to the RTG duration of Table 2. The time points may be varied according to the TTG and RTG durations. Accordingly, if one subframe is constructed of 6 OFDM symbols, three residual OFDM symbols remain. Among the three residual OFDM symbols, one OFDM symbol is further allocated to the DL duration, one OFDM symbol is further allocated to the UL duration, and the remaining one OFDM symbol is allocated between the TTG and RTG durations. In other words, the last DL subframe is constructed of 7 OFDM symbols in FDD, and the last symbol in this subframe is punctured and is converted to a subframe of 6 OFDM symbols in TDD due to the TTG duration. This may be considered an idle symbol. In the second TDD frame structure of FIG. 10, a first subframe of the DL duration is constructed of 7 OFDM symbols and a last subframe of the UL duration is constructed of 7 OFDM symbols. However, any one subframe belonging to the DL duration can be constructed of 7 OFDM symbols instead of the first subframe, and any one subframe belonging to the UL duration can be constructed of 7 OFDM symbols instead of the last subframe. In addition, the DL duration can be constructed of a plurality of subframes consisting of 6 OFDM symbols and the remaining one independent OFDM symbol, and the UL duration can be constructed of a plurality of subframes consisting of 6 OFDM symbols and the remaining one independent OFDM symbol. The remaining one independent OFDM may follow a subframe consisting of 6 OFDM symbols, or may be a symbol of a subframe consisting of 7 OFDM symbols (e.g., a seventh, or last, symbol). Such a subframe structure is for exemplary purposes only. That is, the subframes belonging to the DL duration can be constructed of any number of OFDM symbols, and the subframes belonging to the UL duration can be constructed of any number of OFDM symbols, wherein the subframes can have different sizes.

In a third TDD frame structure of this embodiment, a CP length is 1/32 Tu. A total frame length is 5 ms. A DL duration is a time period between a start point of a frame and a time point of 3016.32 µs, and includes 32 OFDM symbols with a CP length of 1/32 Tu. A TTG duration is a time period between the time point of 3016.32 µs and a time point of 3054.80 µs, and thus includes a time period of 38.48 µs corresponding to a portion of the idle time and the TTG duration of Table. 2. A CL duration is a time period between the time point of 3054.80 µs and a time point of 4940 µs, and includes 20 OFDM symbols with a CP length of 1/32 Tu. An RTG duration is a time period between the time point of 4940 µs and an end point of the frame, and thus includes a time period of 60 µs corresponding to the RTG duration of Table 2. The time points may be varied according to the TTG and RTG durations. Accordingly, if one subframe is constructed of 6 OFDM symbols, 5 residual OFDM symbols remain. Among the 5 residual OFDM symbols, two OFDM symbols are further allocated to the DL duration, two OFDM symbols are further allocated to the UL duration, and the remaining one OFDM symbol is allocated between the TTG and RTG durations. In the third TDD frame structure of FIG. 10, a first subframe and a last subframe of the DL duration are constructed of 7 OFDM symbols and a first subframe and a last subframe of the UL duration are constructed of 7 OFDM symbols. However, any two subframes belonging to the DL duration can be constructed of 7 OFDM symbols instead of the first and last DL subframes, and any two subframes belonging to the UL duration can be constructed of 7 OFDM symbols instead of the first and the last UL subframes. In addition, the DL duration can be constructed of a plurality of subframes consisting of 6 OFDM symbols and the remaining two independent OFDM symbols, and the UL duration can be constructed of a plurality of subframes consisting of 6 OFDM symbols and the remaining two independent OFDM symbols. Such a subframe structure is for exemplary purposes only. That is, the subframes belonging to the DL duration can be constructed of any number of OFDM symbols, and the subframes belonging to the UL duration can be constructed of any number of OFDM symbols, wherein the subframes can have different sizes.

If the TTG duration requires a longer duration than 38.48 µs, one of OFDM symbols additionally allocated to the DL duration or the UL duration can be further allocated for the TTG duration. For example, one of OFDM symbols additionally allocated to the UL duration can be further allocated for the TTG duration, and thus the TTG duration may be 132.74 µs.

When the TDD frame is configured as shown in FIG. 10, mutual interference does not occur even if the frame structures having different CP lengths exist in adjacent cells. That is, mutual interference does not occur since a DL duration of a frame having a CP length of 1/8 Tu does not overlap with a UL duration of a frame having a CP length of 1/4 Tu, 1/16 Tu, or 1/32 Tu, and a UL duration of a frame having a CP length of 1/8 Tu does not overlap with a DL duration of a frame having a CP length of 1/4 Tu, 1/16 Tu, or 1/32 Tu.

Figure 11:
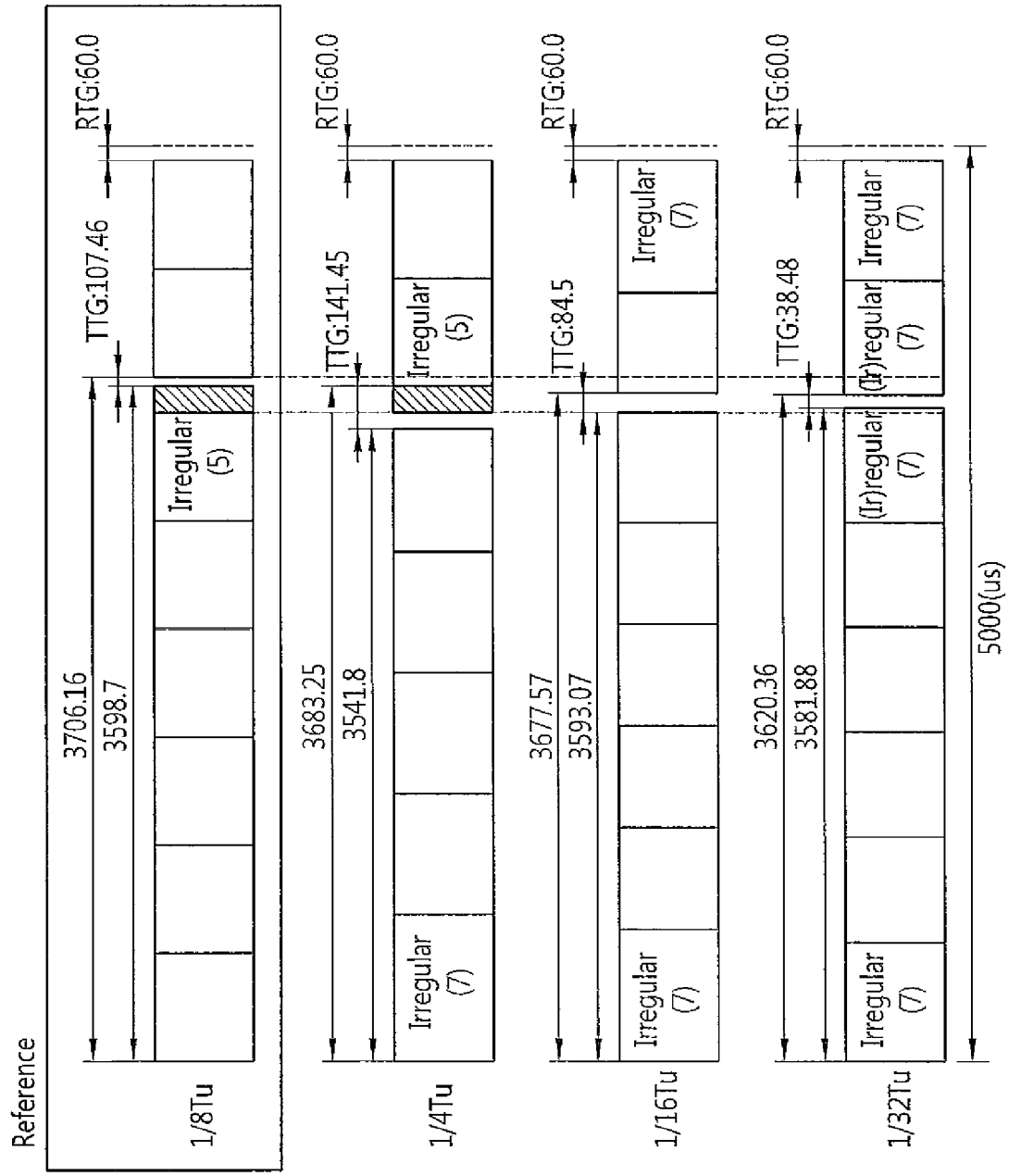
FIG. 11 shows TDD frame structures having a CP length of $1/4$ Tu, $1/16$ Tu, or $1/32$ Tu with a CP length of $1/8$ Tu and when a DL/UL ratio is 6:2 according to an embodiment of the present invention.

FIG. 11 shows TDD frame structures having a CP length of 1/4 Tu, 1/16 Tu, or 1/32 Tu with a CP length of 1/8 Tu and when a DL/UL ratio is 6:2 according to an embodiment of the present invention.

Referring to FIG. 11, a reference frame has the same conventional structure of FIG. 6. That is, the frame has a total length of 5 ms and a CP length of 1/8 Tu, and includes 8 subframes.

In a first TDD frame structure of this embodiment, a CP length is 1/4 Tu. A total frame length is 5 ms. A DL duration is a time period between a start point of a frame and a time point of 3541.8 µs, and includes 31 OFDM symbols with a CP length of 1/4 Tu. A TTG duration is a time period between the time point of 3541.8 µs and a time point of 3683.25 µs, and thus includes a time period of 141.45 µs corresponding to a portion of the idle time and the TTG duration of Table. 2. A UL duration is a time period between the time point of 3683.25 µs and a time point of 4940 µs, and includes 11 OFDM symbols with a CP length of 1/4 Tu. An RTG duration is a time period between the time point of 4940 µs and an end point of the frame, and thus includes a time period of 60 µs corresponding to the RTG duration of Table 2. The time points may be varied according to the TTG and RTG durations. Accordingly, if one subframe is constructed of 6 OFDM symbols, one residual OFDM symbol is further allocated to the DL duration, a first subframe of the UL duration is constructed of 5 OFDM symbols, and one OFDM symbol preceding the first subframe of the UL duration is punctured. In the first TDD frame structure of FIG. 11, a first subframe of the DL duration is constructed of 7 OFDM symbols. However, any one subframe belonging to the DL duration can be constructed of 7 OFDM symbols instead of the first subframe. In addition, the DL duration can be constructed of a plurality of subframes consisting of 6 OFDM symbols and the remaining one independent OFDM symbol. Such a subframe structure is for exemplary purposes only. That is, the subframes belonging to the DL duration can be constructed of any number of OFDM symbols, and the subframes belonging to the UL duration can be constructed of any number of OFDM symbols, wherein the subframes can have different sizes.

Alternatively, in the TDD frame structure having a CP length of 1/4 Tu, if one subframe is constructed of 5 OFDM symbols, one residual OFDM symbol can be further allocated to the DL duration, one residual OFDM symbol can be further allocated to the UL duration, and the remaining one OFDM symbol can be allocated to the TTG duration. This alternative method is the same as the case of 1/4 Tu, which was explained with a DL to UL ratio of 4:4 in FIG. 9.

In a second TDD frame structure of this embodiment, a CP length is 1/16 Tu. A total frame length is 5 ms. A DL duration is a time period between a start point of a frame and a time point of 3593.07 µs, and includes 37 OFDM symbols with a CP length of 1/16 Tu. A TTG duration is a time period between the time point of 3593.07 µs and a time point of 3677.57 µs, and thus includes a time period of 84.5 µs corresponding to a portion of the idle time and the TTG duration of Table. 2. A UL duration is a time period between the time point of 3677.57 µs and a time point of 4940 µs, and includes 13 OFDM symbols with a CP length of 1/16 Tu. An RTG duration is a time period between the time point of 4940 µs and an end point of the frame, and thus includes a time period of 60 µs corresponding to the RTG duration of Table 2. The time points may be varied according to the TTG and RTG durations. Accordingly, if one subframe is constructed of 6 OFDM symbols, three residual OFDM symbols remain. Among the three residual OFDM symbols, one OFDM symbol is further allocated to the DL duration, one OFDM symbol is further allocated to the UL duration, and the remaining one OFDM symbol is allocated between the TTG and RTG durations. In other words, the last DL subframe is constructed of 7 OFDM symbols in FDD, and the last symbol in this subframe is punctured and is converted to a subframe of 6 OFDM symbols in TDD due to the TTG duration. In the second TDD frame structure of FIG. 11, a first subframe of the DL duration is constructed of 7 OFDM symbols and a last subframe of the UL duration is constructed of 7 OFDM symbols. However, any one subframe belonging to the DL duration can be constructed of 7 OFDM symbols instead of the first subframe, and any one subframe belonging to the UL duration can be constructed of 7 OFDM symbols instead of the last subframe. In addition, the DL duration can be constructed of a plurality of subframes consisting of 6 OFDM symbols and the remaining one independent OFDM symbol, and the UL duration can be constructed of a plurality of subframes consisting of 6 OFDM symbols and the remaining one independent OFDM symbol. Such a subframe structure is for exemplary purposes only. That is, the subframes belonging to the DL duration can be constructed of any number of OFDM symbols, and the subframes belonging to the UL duration can be constructed of any number of OFDM symbols, wherein the subframes can have different sizes.

In a third TDD frame structure of this embodiment, a CP length is $\frac{1}{32}$ Tu. A total frame length is 5 ms. A DL duration is a time period between a start point of a frame and a time point of 3581.88 µs, and includes 38 OFDM symbols with a CP length of $\frac{1}{32}$ Tu. A TTG duration is a time period between the time point of 3581.88 µs and a time point of 3620.36 µs, and thus includes a time period of 38.48 µs corresponding to a portion of the idle time and the TTG duration of Table. 2. A UL duration is a time period between the time point of 3620.36 µs and a time point of 4940 µs, and includes 14 OFDM symbols with a CP length of $\frac{1}{32}$ Tu. An RTG duration is a time period between the time point of 4940 µs and an end point of the frame, and thus includes a time period of 60 µs corresponding to the RTG duration of Table 2. The time points may be varied according to the TTG and RTG durations. Accordingly, if one subframe is constructed of 6 OFDM symbols, 5 residual OFDM symbols remain. Among the 5 residual OFDM symbols, two OFDM symbols are further allocated to the DL duration, two OFDM symbols are further allocated to the UL duration, and the remaining one OFDM symbol is allocated between the TTG and RTG durations. In the third TDD frame structure of FIG. 11, a first subframe and a last subframe of the DL duration are constructed of 7 OFDM symbols. However, any two subframes belonging to the DL duration can be constructed of 7 OFDM symbols instead of the first and last DL subframes. In addition, the DL duration can be constructed of a plurality of subframes consisting of 6 OFDM symbols and the remaining two independent OFDM symbols, and the UL duration can be constructed of a plurality of subframes consisting of 6 OFDM symbols and the remaining two independent OFDM symbols. Such a subframe structure is for exemplary purposes only. That is, the subframes belonging to the DL duration can be constructed of any number of OFDM symbols, and the subframes belonging to the UL duration can be constructed of any number of OFDM symbols, wherein the subframes can have different sizes.

If the TTG duration requires a longer duration than 38.48 µs, one of OFDM symbols additionally allocated to the DL duration or the UL duration can be further allocated for the TTG duration. For example, one of OFDM symbols additionally allocated to the UL duration can be further allocated for the TTG duration, and thus the TTG duration may be 132.74 µs.

When the TDD frame is configured as shown in FIG. 11, mutual interference does not occur even if the frame structures having different CP lengths exist in adjacent cells. That is, mutual interference does not occur since a DL duration of a frame having a CP length of $\frac{1}{8}$ Tu does not overlap with a UL duration of a frame having a CP length of $\frac{1}{4}$ Tu, $\frac{1}{16}$ Tu, or $\frac{1}{32}$ Tu, and a UL duration of a frame having a CP length of $\frac{1}{8}$ Tu does not overlap with a DL duration of a frame having a CP length of $\frac{1}{4}$ Tu, $\frac{1}{16}$ Tu, or $\frac{1}{32}$ Tu.

Figure 12:
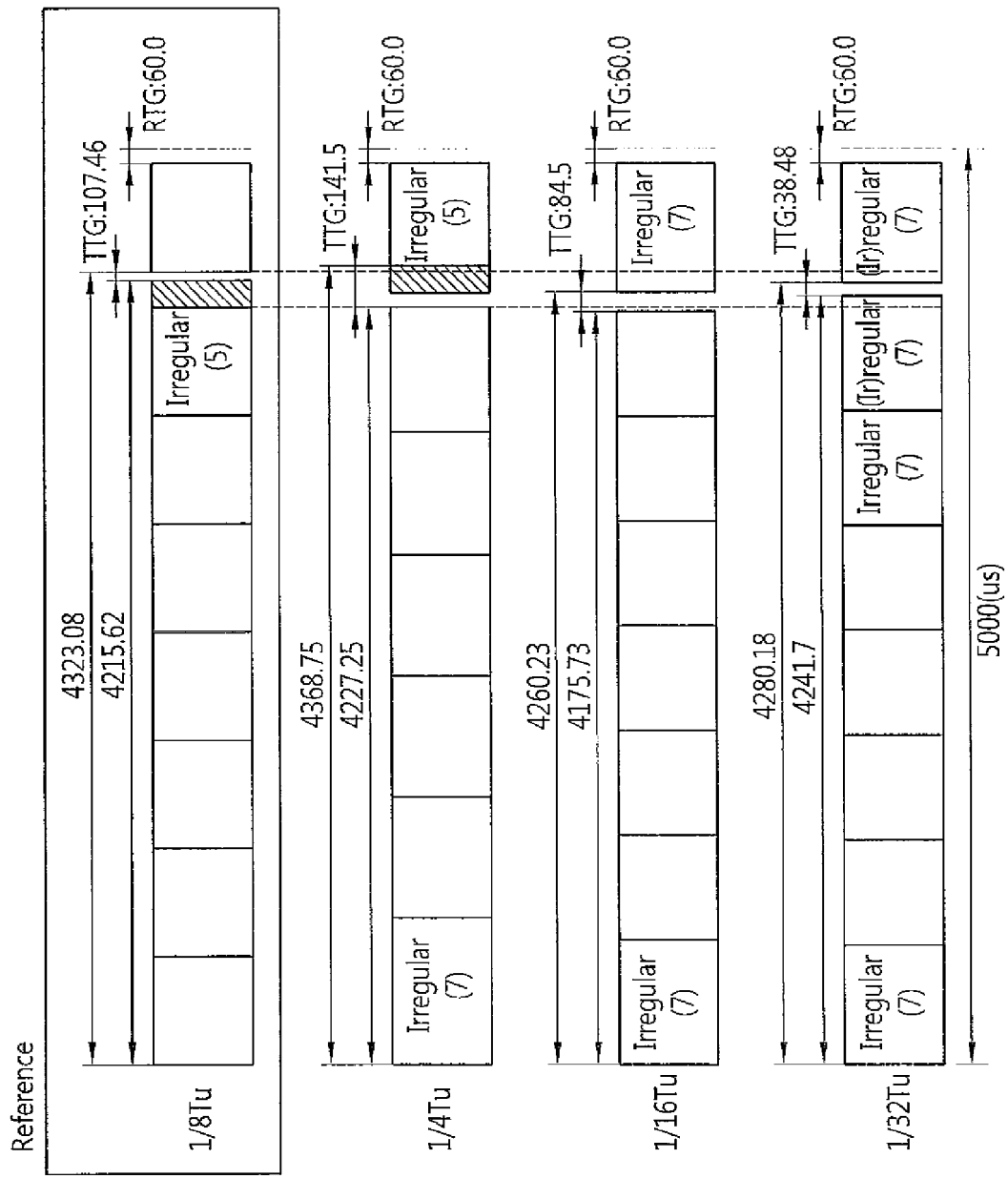
FIG. 12 shows TDD frame structures having a CP length of $1/4$ Tu, $1/16$ Tu, or $1/32$ Tu with a CP length of $1/8$ Tu and when a DL/UL ratio is 7:1 according to an embodiment of the present invention.

FIG. 12 shows TDD frame structures having a CP length of $\frac{1}{4}$ Tu, $\frac{1}{16}$ Tu, or $\frac{1}{32}$ Tu with a CP length of $\frac{1}{8}$ Tu and when a DL/UL ratio is 7:1 according to an embodiment of the present invention.

Referring to FIG. 12, a reference frame has the same conventional structure of FIG. 7. That is, the frame has a total length of 5 ms and a CP length of $\frac{1}{8}$ Tu, and includes 8 subframes.

In a first TDD frame structure of this embodiment, a CP length is $\frac{1}{4}$ Tu. A total frame length is 5 ms. A DL duration is a time period between a start point of a frame and a time point of 4227.25 µs, and includes 37 OFDM symbols with a CP length of $\frac{1}{4}$ Tu. A TTG duration is a time period between the time point of 4227.25 µs and a time point of 4368.75 µs, and thus includes a time period of 141.5 µs corresponding to a portion of the idle time and the TTG duration of Table. 2. A UL duration is a time period between the time point of 4368.75 µs and a time point of 4940 µs, and includes 5 OFDM symbols with a CP length of $\frac{1}{4}$ Tu. An RTG duration is a time period between the time point of 4940 µs and an end point of the frame, and thus includes a time period of 60 µs corresponding to the RTG duration of Table 2. The time points may be varied according to the TTG and RTG durations. Accordingly, if one subframe is constructed of 6 OFDM symbols, one residual OFDM symbol is further allocated to the DL duration, a first subframe of the UL duration is constructed of 5 OFDM symbols, and one OFDM symbol preceding the first subframe of the UL duration is punctured. In the first TDD frame structure of FIG. 12, a first subframe of the DL duration is constructed of 7 OFDM symbols. However, any one subframe belonging to the DL duration can be constructed of 7 OFDM symbols. instead of the first subframe In addition, the DL duration can be constructed of a plurality of subframes consisting of 6 OFDM symbols and the remaining one independent OFDM symbol. Such a subframe structure is for exemplary purposes only. That is, the subframes belonging to the DL duration can be constructed of any number of OFDM symbols, and the subframes belonging to the UL duration can be constructed of any number of OFDM symbols, wherein the subframes can have different sizes.

Alternatively, in the TDD frame structure having a CP length of $\frac{1}{4}$ Tu, if one subframe is constructed of 5 OFDM symbols, one residual OFDM symbol can be further allocated to the DL duration, one residual OFDM symbol can be further allocated to the UL duration, and the remaining one residual OFDM symbol can be allocated to the TTG duration. This alternative method is the same as the case of $\frac{1}{4}$ Tu, which was explained with a DL to UL ratio of 4:4 in FIG. 9.

In a second TDD frame structure of this embodiment, a CP length is $\frac{1}{16}$ Tu. A total frame length is 5 ms. A DL duration is a time period between a start point of a frame and a time point of 4175.73 µs, and includes 43 OFDM symbols with a CP length of $\frac{1}{16}$ Tu. A TTG duration is a time period between the time point of 4175.73 µs and a time point of 4260.23 µs, and thus includes a time period of 84.5 µs corresponding to a portion of the idle time and the TTG duration of Table. 2. A UL duration is a time period between the time point of 4260.23 µs and a time point of 4940 µs, and includes 7 OFDM symbols with a CP length of $\frac{1}{16}$ Tu. An RTG duration is a time period between the time point of 4940 µs and an end point of the frame, and thus includes a time period of 60 µs corresponding to the RTG duration of Table 2. The time points may be varied according to the TTG and RTG durations. Accordingly, if one subframe is constructed of a plurality of OFDM symbols, three residual OFDM symbols remain. Among the three residual OFDM symbols, one OFDM symbol is further allocated to the DL duration, one OFDM symbol is further allocated to the UL duration, and the remaining one OFDM symbol is allocated between the TTG and RTG durations. In other words, the last DL subframe is constructed of 7 OFDM symbols in FDD, and the last symbol in this subframe is punctured and is converted to a subframe of 6 OFDM symbols in TDD due to the TTG duration. In the second TDD frame structure of FIG. 12, a first subframe of the DL duration is constructed of 7 OFDM symbols. However, any one subframe belonging to the DL duration can be constructed of 7 OFDM symbols instead of the first subframe. In addition, the DL duration can be constructed of a plurality of subframes consisting of 6 OFDM symbols and the remaining one independent OFDM symbol. Such a subframe structure is for exemplary purposes only. That is, the subframes belonging to the DL duration can be constructed of any number of OFDM symbols, and the subframes belonging to the UL duration can be constructed of any number of OFDM symbols, wherein the subframes can have different sizes.

In a third TDD frame structure of this embodiment, a CP length is 1/32 Tu. A total frame length is 5 ms. A DL duration is a time period between a start point of a frame and a time point of 4241.7 μs and includes 45 OFDM symbols with a CP length of 1/32 Tu. A TTG duration is a time period between the time point of 4241.7 μs and a time point of 4280.18 μs, and thus includes a time period of 38.48 μs corresponding to a portion of the idle time and the TTG duration of Table. 2. A UL duration is a time period between the time point of 4280.18 μs and a time point of 4940 μs, and includes 7 OFDM symbols with a CP length of 1/32 Tu. An RTG duration is a time period between the time point of 4940 μs and an end point of the frame, and thus includes a time period of 60 μs corresponding to the RTG duration of Table 2. The time points may be varied according to the TTG and RTG durations. Accordingly, if one subframe is constructed of 6 OFDM symbols, 5 residual OFDM symbols remain. Among the 5 residual OFDM symbols, 3 OFDM symbols are further allocated to the DL duration, one OFDM symbol is further allocated to the UL duration, and the remaining one OFDM symbol is allocated between the TTG and RTG durations. In the third TDD frame structure of FIG. 12, $1^{st}$, $6^{th}$, and $7^{th}$ subframes of the DL duration are constructed of 7 OFDM symbols. However, any three subframes belonging to the DL duration can be constructed of 7 OFDM symbols instead of these three subframes. In addition, the DL duration can be constructed of a plurality of subframes consisting of 6 OFDM symbols and the remaining three independent OFDM symbols, and the UL duration can be constructed of a plurality of subframes consisting of 6 OFDM symbols and the remaining one independent OFDM symbol. Such a subframe structure is for exemplary purposes only. That is, the subframes belonging to the DL duration can be constructed of any number of OFDM symbols, and the subframes belonging to the UL duration can be constructed of any number of OFDM symbols, wherein the subframes can have different sizes.

If the TTG duration requires a longer duration than 38.48 μs, one of OFDM symbols additionally allocated to the DL duration or the UL duration can be further allocated for the TTG duration. For example, one of OFDM symbols additionally allocated to the UL duration can be further allocated for the TTG duration, and thus the TTG duration may be 132.74 μs.

When the TDD frame is configured as shown in FIG. 12, mutual interference does not occur even if the frame structures having different CP lengths exist in adjacent cells. That is, mutual interference does not occur since a DL duration of a frame having a CP length of 1/8 Tu does not overlap with a UL duration of a frame having a CP length of 1/4 Tu, 1/16 Tu, or 1/32 Tu, and a UL duration of a frame having a CP length of 1/8 Tu does not overlap with a DL duration of a frame having a CP length of 1/4 Tu, 1/16 Tu, or 1/32 Tu.

Table 3 below summarizes some of the features shown in FIGS. 9-12 and shows a frame structure having a different CP length according to the above-described embodiments of the invention and coexisting with a conventional reference frame structure.

TABLE 3

| | Values or Features DL/UL Ratio with a CP of 1/8Tu | | | | | | | | | | | |
|---|---|---|---|---|---|---|---|---|---|---|---|---|
| Parameters | 4:4 | 5:3 | 6:2 | 7:1 | 4:4 | 5:3 | 6:2 | 7:1 | 4:4 | 5:3 | 6:2 | 7:1 |
| CP lengths(μs) | | 1/4Tu | | | | 1/16Tu | | | | 1/32Tu | | |
| Total No. of Symbols per 5 ms Frame(Nsym) | | 43 | | | | 51 | | | | 53 | | |
| No. of Residue Symbols(=Nsym mod 6) | | 1 (In case of Nsym mod 5, 3 Residue Symbols) | | | | 3 | | | | 5 | | |
| Positions of Residue Symbols | | One in DL (In case of Nsym mod 5, One in DL, One in UL and One in TTG) | | | | One in DL, One in UL, and One in TTG | | | | Two in DL, Two in UL, and One in TTG (+)In case of 7:1, Three in DL, One in UL, and One in TTG (+)In case of 4:4, Two in DL, One in UL, and Two in TTG | | |
| No. of Punctured Symbols in Regular Subframes | | 1 (In case of Nsym mod 5, 0 Punctured Symbol) | | | | 0 | | | | 0 | | |

TABLE 3-continued

| Parameters | Values or Features DL/UL Ratio with a CP of ⅛Tu | | | | | | | | | | | |
|---|---|---|---|---|---|---|---|---|---|---|---|---|
| | 4:4 | 5:3 | 6:2 | 7:1 | 4:4 | 5:3 | 6:2 | 7:1 | 4:4 | 5:3 | 6:2 | 7:1 |
| Size of DL(μs) | 2399.25 (Nsym mod 5) | 2856.25 | 3541.8 | 4227.25 | 2427.8 | 3010.41 | 3593.07 | 4175.73 | 2450.76 | 3016.32 | 3581.88 | 4241.7 |
| Size of UL(μs) | 2399.25 (Nsym mod 5) | 1942.25 | 1256.75 | 571.25 | 2428.4 | 1845.09 | 1262.43 | 679.77 | 2356.5 | 1885.2 | 1319.64 | 659.82 |
| No. Of Regular Subframes | | 5 (In case of Nsym mod 5, 6 Regular Subframes) | | | | 6 | | | | 4 | | |
| Size of Irregular Subframes(*) | | 5 and 7 OFDM Symbols (In case of Nsym mod 5, 6 OFDM Symbols) | | | | 7 OFDM Symbols | | | | 7 OFDM Symbols | | |
| No. of Irregular Subframes(*) | | 2 | | | | 2 | | | | 4 | | |

In the TDD frame structure having a DL/UL ratio of 4:4 and having a CP length of ¼ Tu shown in Table 3, it is assumed that one subframe consists of 5 OFDM symbols, and one OFDM symbol is further allocated to the TTG duration in the TDD frame structure having a CP length of 1/32 Tu. In the TDD frame structure having a DL/UL ratio of 7:1 and having a CP length of 1/32 Tu, a residual OFDM symbol is further allocated to the UL duration since only one subframe is allocated for the DL duration. In Table 3, the last two rows indicated by a mark (*) vary according to the number of OFDM symbols constituting one subframe. When the configuration of Table 3 above is applied in systems, one symbol can be optionally further punctured in a UL or DL duration.

<Type of Subframe Depending on the Number of OFDM Symbols Included in Subframe>

FIG. 13 to FIG. 16 each show 1) TDD frame structures from FIG. 9 to 12, respectively, which has a different CP length and coexists with the aforementioned TDD frame structure having a CP length of ⅛ Tu in an adjacent cell, and 2) FDD frame structures having a common feature with the TDD frame structures. A TDD frame and an FDD frame, each of which has a CP length of ¼ Tu, 1/16 Tu, or 1/32 Tu, are configured using three types of subframes.

Hereinafter, a type of the subframe consisting of 6 OFDM symbols is referred to as a subframe type-1 (SFT-1), a type of the subframe consisting of 5 OFDM symbols is referred to as an SFT-2, and a type of the subframe consisting of 7 OFDM symbols is referred to as an SFT-3. An SFT-3 type subframe has a format in which one OFDM symbol is added to an SFT-1 type subframe. The added OFDM symbol may precede or follow the SFT-1 type subframe, or may be located in the middle of the SFT-1 type subframe. The added OFDM symbol may be used for control information (e.g., preambles, sounding, etc.) or for data.

Figure 13:
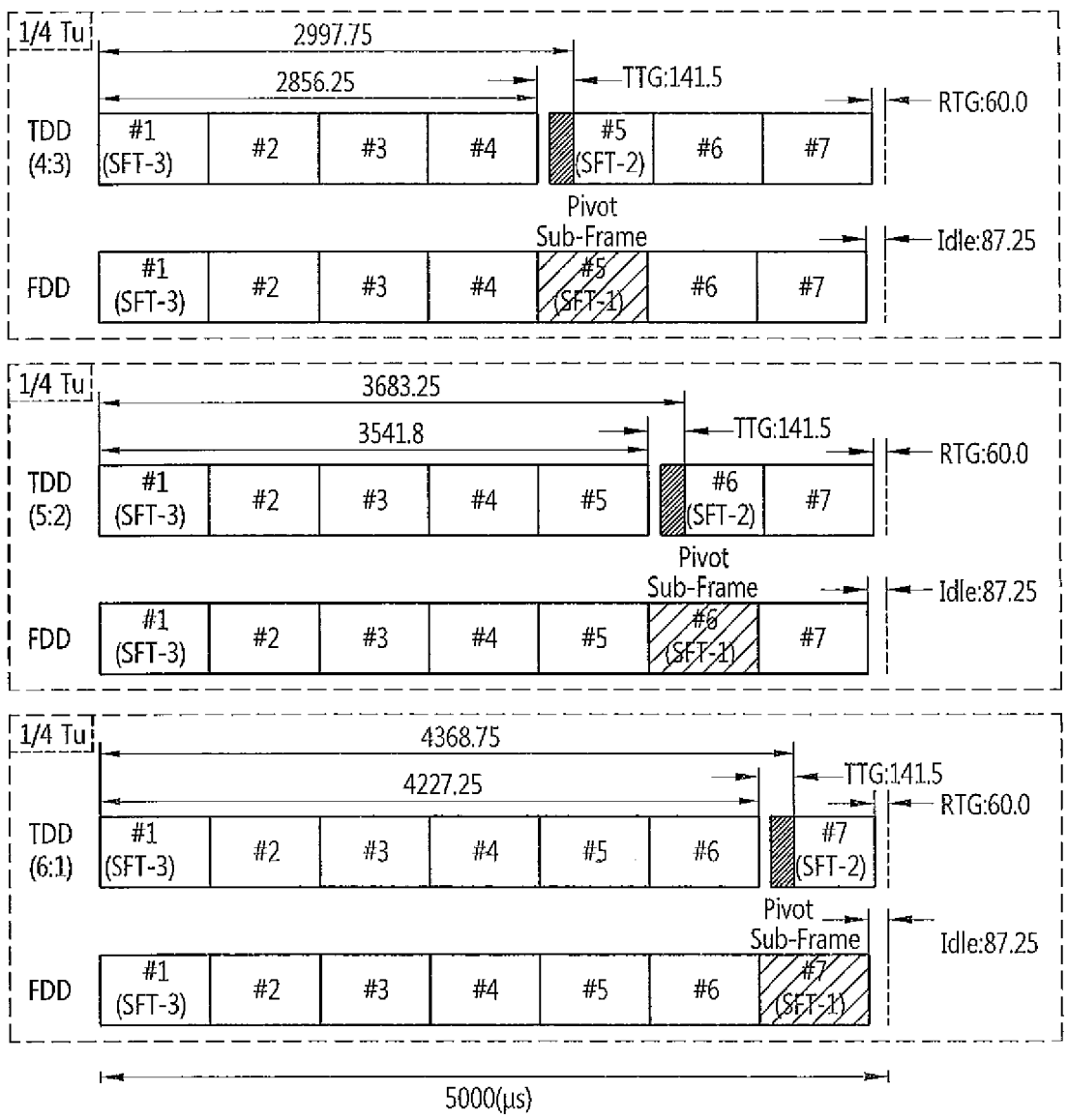
FIG. 13 shows TDD frame structures having a CP length of $1/4$ Tu and FDD frame structures having a common feature with the TDD frame structures according to an embodiment of the present invention.

FIG. 13 shows TDD frame structures having a CP length of ¼ Tu and FDD frame structures having a common feature with the TDD frame structures according to an embodiment of the present invention. In FIG. 13, subframes other than the SFT-2 type and SFT-3 type subframes are SFT-1 type subframes.

Referring to FIG. 13, in a first TDD frame structure of this embodiment, a DL/UL ratio is 4:3 and a CP length is ¼ Tu. A total frame length is 5 ms. A DL duration is a time period between a start point of a frame and a time point of 2856.25 μs, and includes 25 OFDM symbols with a CP length of ¼ Tu. A TTG duration is a time period between the time point of 2856.25 μs and a time point of 2997.75 μs, and thus includes a time period of 141.5 μs corresponding to a portion of the idle time and the TTG duration of Table. 2. A CL duration is a time period between the time point of 2997.75 μs and a time point of 4940 μs, and includes 17 OFDM symbols with a CP length of ¼ Tu. An RTG duration is a time period between the time point of 4940 μs and an end point of the frame, and thus includes a time period of 60 μs corresponding to the RTG duration of Table 2. The time points may be varied according to the TTG and RTG durations.

Accordingly, the DL duration consists of three SFT-1 subframes and one SFT-3 subframe, and the UL duration consists of two SFT-1 subframes and one SFT-2 subframe. In this case, there is no restriction on a subframe type arrangement within the UL duration and the DL duration.

In a second TDD frame structure of this embodiment, a DL/UL ratio is 5:2 and a CP length is ¼ Tu. A total frame length is 5 ms. A DL duration is a time period between a start point of a frame and a time point of 3541.8 μs, and includes 31 OFDM symbols with a CP length of ¼ Tu. A TTG duration is a time period between the time point of 3541.8 μs and a time point of 3683.25 μs, and thus includes a time period of 141.45 μs corresponding to a portion of the idle time and the TTG duration of Table. 2. A UL duration is a time period between the time point of 3683.25 μs and a time point of 4940 μs, and includes 11 OFDM symbols with a CP length of ¼ Tu. An RTG duration is a time period between the time point of 4940 μs and an end point of the frame, and thus includes a time period of 60 μs corresponding to the RTG duration of Table 2. The time points may be varied according to the TTG and RTG durations.

Accordingly, the DL duration consists of four SFT-1 subframes and one SFT-3 subframe, and the UL duration consists of one SFT-1 subframe and one SFT-2 subframe. In this case, there is no restriction on a subframe type arrangement within the UL duration and the DL duration.

In a third TDD frame structure of this embodiment, a DL/UL ratio is 6:1 and a CP length is ¼ Tu. A total frame length is 5 ms. A DL duration is a time period between a start point of a frame and a time point of 4227.25 μs, and includes 37 OFDM symbols with a CP length of ¼ Tu. A TTG duration is a time period between the time point of 4227.25 μs and a time point of 4368.75 μs, and thus includes a time period of 141.5 μs corresponding to a portion of the idle time and the TTG duration of Table. 2. A UL duration is a time period between the time point of 4368.7 μs and a time point of 4940 μs, and includes 5 OFDM symbols with a CP length of ¼ Tu. An RTG duration is a time period between the time point of 4940 μs and an end point of the frame, and thus includes a time period of 60 μs corresponding to the RTG duration of Table 2. The time points may be varied according to the TTG and RTG durations.

Accordingly, the DL duration consists of five SFT-1 subframes and one SFT-3 subframe, and the UL duration consists of one SFT-2 subframe. In this case, there is no restriction on a subframe type arrangement within the UL duration and the DL duration.

By configuring the TDD frame as described above, a DL/UL switch duration can conform to a frame structure having a CP length of ⅛ Tu. Thus, even if a system having a CP length of ⅛ Tu exists in an adjacent cell, interference between uplink and downlink transmissions can be minimized.

Irrespective of a UL/UL ratio, the DL duration includes one SFT-3 type subframe. In FIG. 13, a first subframe #1 of the DL duration is constructed of one SFT-3 type subframe, but this is for exemplary purposes only. That is, if the DL/UL ratio is 4:3, the SFT-3 type subframe can be located at one position selected from positions #1, #2, #3, and #4. If the DL/UL ratio is 5:2, the SFT-3 type subframe can be located at one position selected from positions #1, #2, #3, #4, and #5. If the DL/UL ratio is 6:1, the SFT-3 type subframe can be located at one position selected from positions #1, #2, #3, #4, #5, and #6.

In addition, irrespective of a DL/UL ratio, the UL duration includes one SFT-2 type subframe. In FIG. 13, a first subframe #1 of the UL duration is constructed of the SFT-2 type subframe, but this is for exemplary purposes only. That is, if the DL/UL ratio is 4:3, the SFT-2 type subframe can be located at one position selected from positions #5, #6, and #7, if the DL/UL ratio is 5:2, the SFT-2 type subframe can be located at one position selected from positions #6 and #7, and if the DL/UL ratio is 6:1, the SFT-2 type subframe can be located at a position #7.

Next, in the FDD frame structure, the FDD frame includes one pivot subframe. The pivot subframe is a subframe located at a position corresponding to a TTG duration of the TDD frame so as to maintain a common feature with the TDD frame. When the CP length is ¼ Tu, the pivot subframe is an SFT-1 type subframe. If the DL/UL ratio is 4:3, the TTG duration in the TDD frame is located between positions #4 and #5, and thus the pivot subframe in the FDD frame can be located at a position #5. If the DL/UL ratio is 5:2, the TTG duration in the TDD frame is located between positions #5 and #6, and thus the pivot subframe in the FDD frame can be located at a position #6. If the DL/UL ratio is 6:1, the TTG duration in the TDD frame is located between positions #6 and #7, and thus the pivot subframe in the FDD frame can be located at a position #7. To maintain the common feature with the TDD frame, one SFT-3 type subframe is located ahead of the pivot subframe. That is, if the DL/UL ratio is 4:3, the SFT-3 type subframe can be located at one position selected from positions #1, #2, #3, and #4, if the DL/UL ratio is 5:2, the SFT-3 type subframe can be located at one position selected from positions #1, #2, #3, #4, and #5, and if the DL/UL ratio is 6:1, the SFT-3 type subframe can be located at one position selected from positions #1, #2, #3, #4, #5, and #6.

I FIG. 13, the pivot subframe is only located in #5, #6, and #7. But this is for exemplary purposes only. The other FDD frame with different locations of the pivot subframe may be considered in the same way.

In FIG. 13, a base subframe is constructed of an SFT-1 type subframe in the TDD frame structure having a CP length of ¼ Tu. The base subframe may be constructed of an SFT-2 type subframe.

Figure 14:
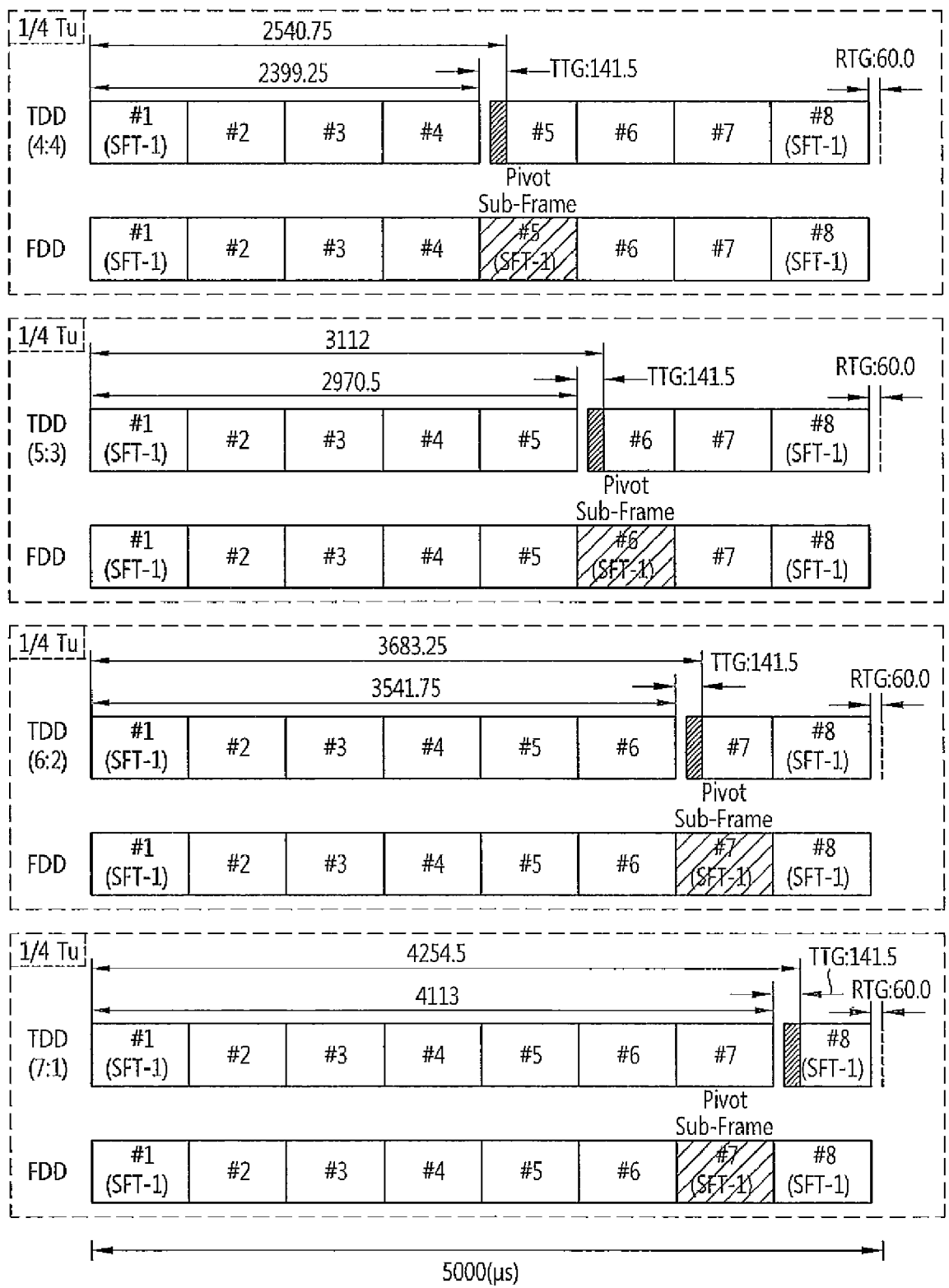
FIG. 14 shows TDD frames having a CP length of $1/4$ Tu and including a base subframe constructed of a subframe type-2 (SFT-2) subframe and FDD frames having a common feature with the TDD frame according to an embodiment of the present invention.

FIG. 14 shows a TDD frame having a CP length of ¼ Tu and including a base subframe constructed of an SFT-2 type subframe and an FDD Frame having a common feature with the TDD frame. In FIG. 14, subframes other than the SFT-1 type subframes are SFT-2 type subframes.

Referring to FIG. 14, in a first TDD frame structure of this embodiment, a DL/UL ratio is 4:4, a CP length is ¼ Tu, and a base subframe is constructed of an SFT-2 type subframe. This structure is the same as the TDD frame structure having a CP length of ¼ Tu as shown in FIG. 9. Accordingly, a DL duration consists of one SFT-1 subframe and three SFT-3 subframes, and a UL duration consists of one SFT-1 subframe and three SFT-2 subframes. In this case, there is no restriction on a subframe type arrangement within the UL duration and the DL duration.

In a second TDD frame of this embodiment, a DL/UL ratio is 5:3, a CP length is ¼ Tu, and a base subframe is constructed of an SFT-2 type subframe. A total frame length is 5 ms. A DL duration is a time period between a start point of a frame and a time point of 2970.5 μs and includes 26 OFDM symbols with a CP length of ¼ Tu. A TTG duration is a time period between the time point of 2970.5 μs and a time point of 3112 μs, and thus includes a time period of 141.5 μs corresponding to a portion of the idle time and the TTG duration of Table. 2. A UL duration is a time period between the time point of 3112 μs and a time point of 4940 μs, and includes 16 OFDM symbols with a CP length of ¼ Tu. An RTG duration is a time period between the time point of 4940 μs and an end point of the frame, and thus includes a time period of 60 μs corresponding to the RTG duration of Table 2. The time points may be varied according to the TTG and RTG durations.

Accordingly, a DL duration consists of one SFT-1 subframe and four SFT-2 subframes, and a UL duration consists of one SFT-1 subframe and two SFT-2 subframes. In this case, there is no restriction on a subframe type arrangement within the UL duration and the DL duration.

In a third TDD frame structure of this embodiment, a DL/UL ratio is 6:2, a CP length is ¼ Tu, and a base subframe is constructed of an SFT-2 type subframe. This structure is the same as the TDD frame structure having a CP length of ¼ Tu as shown in FIG. 11. Accordingly, a DL duration consists of one SFT-1 subframe and five SFT-2 subframes, and a UL duration consists of one SFT-1 subframe and one SFT-2 subframe. In this case, there is no restriction on a subframe type arrangement within the UL duration and the DL duration.

In a fourth TDD frame structure of this embodiment, a DL/UL ratio is 7:1, a CP length is ¼ Tu, and a base subframe is constructed of an SFT-2 type subframe. A total frame length is 5 ms. A DL duration is a time period between a start point of a frame and a time point of 4113 μs, and includes 36 OFDM symbols with a CP length of ¼ Tu. A TTG duration is a time period between the time point of 4113 μs and a time point of 4254.5 μs, and thus includes a time period of 141.5 μs corresponding to a portion of the idle time and the TTG duration of Table. 2. A UL duration is a time period between the time point of 4254.5 μs and a time point of 4940 μs, and includes 6 OFDM symbols with a CP length of ¼ Tu. An RTG duration is a time period between the time point of 4940 μs and an end point of the frame, and thus includes a time period of 60 μs corresponding to the RTG duration of Table 2. The time points may be varied according to the TTG and RTG durations.

Accordingly, a DL duration consists of one SFT-1 subframe and six SFT-2 subframes, and a UL duration consists of one SFT-1 subframe. In this case, there is no restriction on a subframe type arrangement within the UL duration and the DL duration.

By configuring the TDD frame as described above, a DL/UL switch duration can conform to a frame structure having a CP length of ⅛ Tu. Thus, even it a system having a CP length of ⅛ Tu exists in an adjacent cell, interference between uplink and downlink transmissions can be minimized.

If the base subframe is constructed of the SFT-2 type subframe, the DL duration includes one SFT-1 type subframe irrespective of a DL/UL ratio. If the DL/UL ratio is 4:4, the SFT-1 type subframe can be located at one position selected from positions #1, #2, #3, and #4. If the DL/UL ratio is 5:3, the SFT-1 type subframe can be located at one position selected from positions #1, #2, #3, #4, and #5. If the DL/UL ratio is 6:2, the SFT-3 type subframe can be located at one position selected from positions #1, #2, #3, #4, #5, and #6. If the DL/UL ratio is 7:1, the SFT-1 type subframe can be located at one position selected from positions #1, #2, #3, #4, #5, #6, and #7.

If the base subframe is constructed of the SFT-2 type subframe, the UL duration includes one SFT-1 type subframe irrespective of a DL/UL ratio. If the DL/UL ratio is 4:4, the SFT-1 type subframe can be located at one position selected from positions #5, #6, #7 and #8. If the DL/UL ratio is 5:3, the SFT-1 type subframe can be located at one position selected from positions #6, #7, and #8. If the DL/UL ratio is 6:2, the SFT-3 type subframe can be located at one position selected from positions #7 and #8. If the DL/UL ratio is 7:1, the SFT-1 type subframe can be located at a position #8.

Next, in the FDD frame structure in which a CP length is ¼ Tu and a base subframe is constructed of an SFT-2 subframe, the pivot subframe can be located at a position corresponding to a TTG duration of the TDD frame. Herein, the pivot subframe is an SFT-1 type subframe. If the DL/UL ratio is 4:4, the TTG duration in the TDD frame is located between positions #4 and #5, and thus the pivot subframe in the FDD frame can be located at a position #4 or #5. If the DL/UL ratio is 5:3, the TTG duration in the TDD frame is located between positions #5 and #6, and thus the pivot subframe in the FDD frame can be located at a position #5 or #6. If the DL/UL ratio is 6:2, the TTG duration in the TDD frame is located between positions #6 and #7, and thus the pivot subframe in the FDD frame can be located at a position #6 or #7. If the DL/UL ratio is 7:1, the TTG duration in the TDD frame is located between positions #7 and #8, and thus the pivot subframe in the FDD frame can be located at a position #7 or #8. However, since the UL duration includes one SFT-1 type subframe, if the DL/UL ratio is 7:1, the pivot subframe is preferably located at the position #7.

To maintain the common feature with the TDD frame, one SFT-1 type subframe is located ahead of the pivot subframe, and one SFT-1 type subframe is located behind of the pivot subframe. That is, if the DL/UL ratio is 4:4, when the pivot subframe is located at a position #4, the SFT-1 type subframes other than the pivot subframe can be located at one position selected from positions #1, #2, and #3 and at one position selected from positions #5, #6, #7, and #8, or when the pivot subframe is located at the position #5, the SFT-1 type subframes can be located at one position selected from positions #1, #2, #3, and #4 and at one position selected from positions #6, #7, and #8. If the DL/UL ratio is 5:3, when the pivot subframe is located at a position #5, the SFT-1 type subframes other than the pivot subframe can be located at one position selected from positions #1, #2, #3, and #4 and at one position selected from positions #6, #7, and #8, or when the pivot subframe is located at the position #6, the SFT-1 type subframes can be located at one position selected from positions #1, #2, #3, #4, and #5 and at one position selected from positions #7 and #8. If the DL/UL ratio is 6:2, when the pivot subframe is located at a position #6, the SFT-1 type subframes other than the pivot subframe can be located at one position selected from positions #1, #2, #3, #4, and #5 and at one position selected from positions #7 and #8, or when the pivot subframe is located at the position #7, the SFT-1 type subframes can be located at one position selected from positions #1, #2, #3, #4, #5, and #6 and at a position #8. If the DL/UL ratio is 7:1, when the pivot subframe is located at a position #7, the SFT-1 type subframes other than the pivot subframe can be located at one position selected from positions #1, #2, #3, #4, #5, and #6 and at a position #8, or when the pivot subframe is located at the position #8, the SFT-1 type subframes can be located at two positions selected from positions #1, #2, #3, #4, #S, #6, and #7.

In FIG. 14, the pivot subframe is only located in #5, #6, #7, and #8. But this is for exemplary purposes only. The other FDD frame with different locations of the pivot subframe may be considered in the same way.

Figure 15:
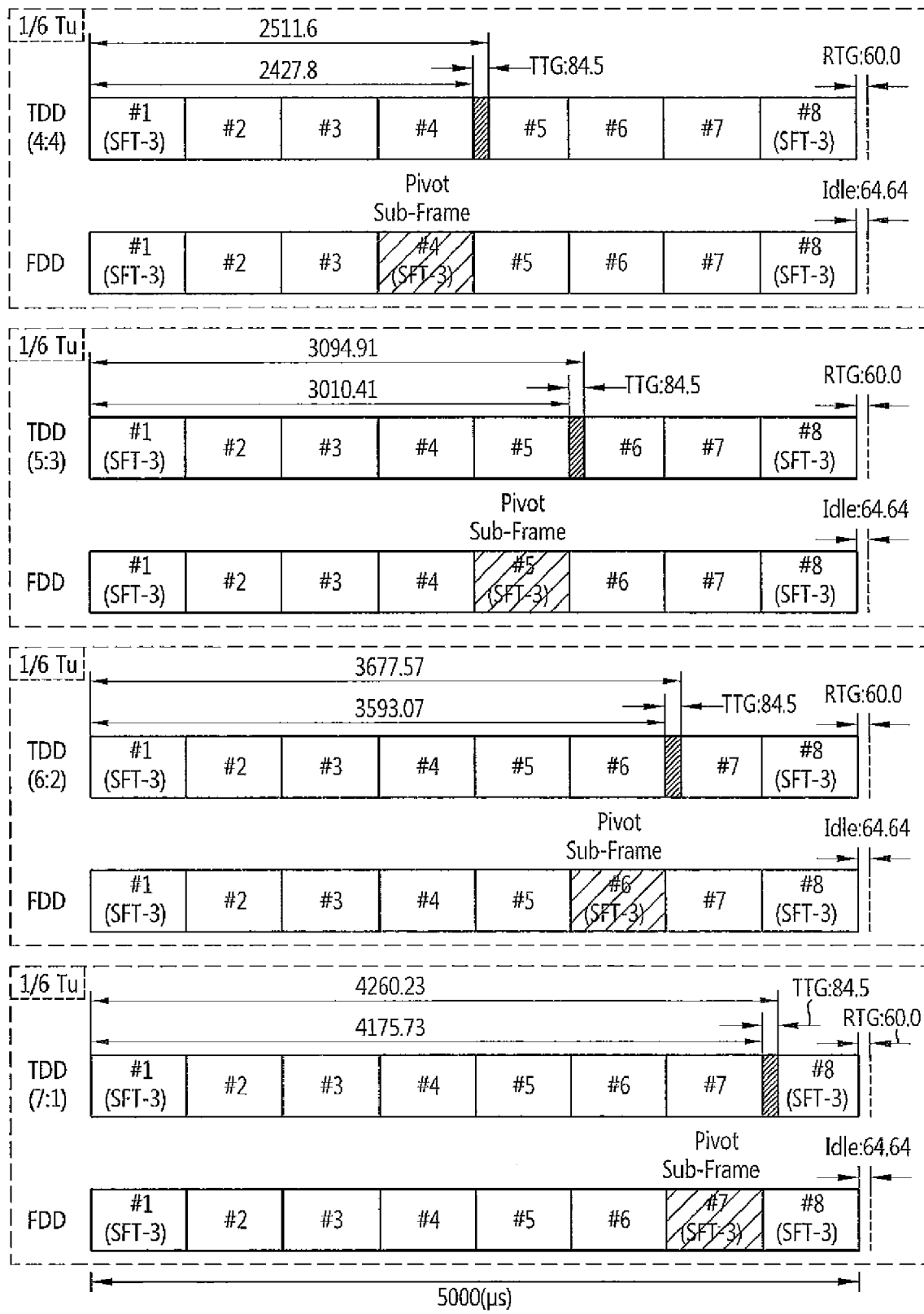
FIG. 15 shows TDD frame structures having a CP length of $1/16$ Tu and FDD frame structures having a common feature with the TDD frame structures according to an embodiment of the present invention.

FIG. 15 shows TDD frame structures having a CP length of 1/16 Tu and FDD frame structures having a common feature with the TDD frame structures according to an embodiment of the present invention. In FIG. 15, subframes other than the SFT-3 type subframes are SFT-1 type subframes.

Referring to FIG. 15, in a first TDD frame structure of this embodiment, a DL/UL ratio is 4:4 and a CP length is 1/16 Tu. This structure is the same as the TDD frame structure having a CP length of 1/16 Tu as shown in FIG. 9. Accordingly, a DL duration consists of one SFT-3 subframe and three SFT-1 subframes, and a UL duration consists of one SFT-3 subframe and three SFT-1 subframes. In this case, there is no restriction on a subframe type arrangement within the UL duration and the DL duration.

In a second TDD frame structure of this embodiment, a DL/UL ratio is 5:3 and a CP length is 1/16 Tu. This structure is the same as the TDD frame structure having a CP length of 1/16 Tu as shown in FIG. 10. Accordingly, a DL duration consists of one SFT-3 subframe and four SFT-1 subframes, and a UL duration consists of one SFT-3 subframe and two SFT-1 subframes. In this case, there is no restriction on a subframe type arrangement within the UL duration and the DL duration.

In a third TDD frame structure of this embodiment, a DL/UL ratio is 6:2 and a CP length is 1/16 Tu. This structure is the same as the TDD frame structure having a CP length of 1/16 Tu as shown in FIG. 11. Accordingly, a DL duration consists of one SFT-3 subframe and five SFT-1 subframes, and a UL duration consists of one SFT-3 subframe and one SFT-1 subframe. In this case, there is no restriction on a subframe type arrangement within the UL duration and the DL duration.

In a fourth TDD frame structure of this embodiment, a DL/UL ratio is 7:1 and a CP length is 1/16 Tu. This structure is the same as the TDD frame structure having a CP length of 1/16 Tu as shown in FIG. 12.

Accordingly, a DL duration consists of one SFT-3 subframe and six SFT-1 subframes, and a UL duration consists of one SFT-3 subframe. In this case, there is no restriction on a subframe type arrangement within the UL duration and the DL duration.

By configuring the TDD frame as described above, a DL/UL switch duration can conform to a frame structure having a CP length of ⅛ Tu. Thus, even if a system having a CP length of ⅛ Tu exists in an adjacent cell, interference between uplink and downlink transmissions can be minimized.

Irrespective of a DL/UL ratio, the DL duration includes one SFT-3 type subframe. In FIG. 15, a first subframe #1 of the DL duration is constructed of the SFT-3 type subframe, but this is for exemplary purposes only. That is, if the DL/UL ratio is 4:4, the SFT-3 type subframe can be located at one position selected from positions #1, #2, #3, and #4. If the DL/UL ratio is 5:3, the SFT-3 type subframe can be located at one position selected from positions #1, #2, #3, #4, and #5. If the DL/UL ratio is 6:2, the SFT-3 type subframe can be located at one position selected from positions #1, #2, #3, #4, #5, and #6. If the DL/UL ratio is 7:1, the SFT-3 type subframe can be located at one position selected from positions #1, #2, #3, #4, #5, #6, and #7.

In addition, irrespective of a DL/UL ratio, the DL duration includes one SFT-3 type subframe. In FIG. 15, a last subframe #8 of the UL duration is constructed of the SFT-3 type subframe, but this is for exemplary purposes only.

That is, if the DL/UL ratio is 4:4, the SFT-3 type subframe can be located at one position selected from positions #5, #6, #7, and #8. If the DL/UL ratio is 5:3, the SFT-3 type subframe can be located at one position selected from positions #6, #7, and #8. If the DL/UL ratio is 6:2, the SFT-3 type subframe can be located at one position selected from positions #7 and #8. If the DL/UL ratio is 7:1, the SFT-3 type subframe can be located at a position #8.

Next, in the FDD frame structure, the FDD frame includes one pivot subframe. As shown in FIG. 15, the pivot subframe may be an SFT-3 type subframe. The pivot subframe may be located at a position corresponding to a TTG duration of the TDD frame. That is, if the DL/UL ratio is 4:4, the TTG duration in the TDD frame is located between positions #4 and #5, and thus the pivot subframe in the FDD frame can be located at a position #4 or #5. If the DL/UL ratio is 5:3, the TTG duration in the TDD frame is located between positions #5 and #6, and thus the pivot subframe in the FDD frame can be located at a position #5 (preferably) or position #6. If the DL/UL ratio is 6:2, the TTG duration in the TDD frame is located between positions #6 and #7, and thus the pivot subframe in the FDD frame can be located at a position #6 or #7. If the DL/UL ratio is 7:1, the TTG duration in the TDD frame is located between positions #7 and #8, and thus the pivot subframe in the FDD frame can be located at a position #7 or #8. However, since the UL duration includes one SFT-3 type subframe, if the DL/UL ratio is 7:1, the pivot subframe is preferably located at the position #7.

To maintain the common feature with the TDD frame, one SFT-3 type subframe is located ahead of the pivot subframe, and one SFT-3 type subframe is located behind of the pivot subframe. That is, if the DL/UL ratio is 4:4, when the pivot subframe is located at a position #4, the SFT-3 type subframes other than the pivot subframe can be located at one position selected from positions #1, #2, and #3 and at one position selected from positions #5, #6, #7, and #8, or when the pivot subframe is located at the position #5, the SFT-3 type subframes can be located at one position selected from positions #1, #2, #3, and #4 and at one position selected from positions #6, #7, and #8. If the DL/UL ratio is 5:3, when the pivot subframe is located at a position #5, the SFT-3 type subframes other than the pivot subframe can be located at one position selected from positions #1, #2, #3, and #4 (preferably position #1) and at one position selected from positions #6, #7, and #8 (preferably position #8), or when the pivot subframe is located at the position #6, the SFT-3 type subframes can be located at one position selected from positions #1, #2, #3, #4, and #5 and at one position selected from positions #7 and #8. If the DL/UL ratio is 6:2, when the pivot subframe is located at a position #G, the SFT-3 type subframes other than the pivot subframe can be located at one position selected from positions #1, #2, #3, #4, and #5 and at one position selected from positions #7 and #8, or when the pivot subframe is located at the position #7, the SFT-3 type subframes can be located at one position selected from positions #1, #2, #3, #4, #5, and #6 and at a position #8. If the DL/UL ratio is 7:1, when the pivot subframe is located at a position #7, the SFT-3 type subframes other than the pivot subframe can be located at one position selected from positions #1, #2, #3, #4, #5, and #6 and at a position #8.

In FIG. 15, the pivot subframe is only located in #4, #5, #6, and #7. But this is for exemplary purposes only. The other FDD frame with different locations of the pivot subframe may be considered in the same way.

Figure 16:
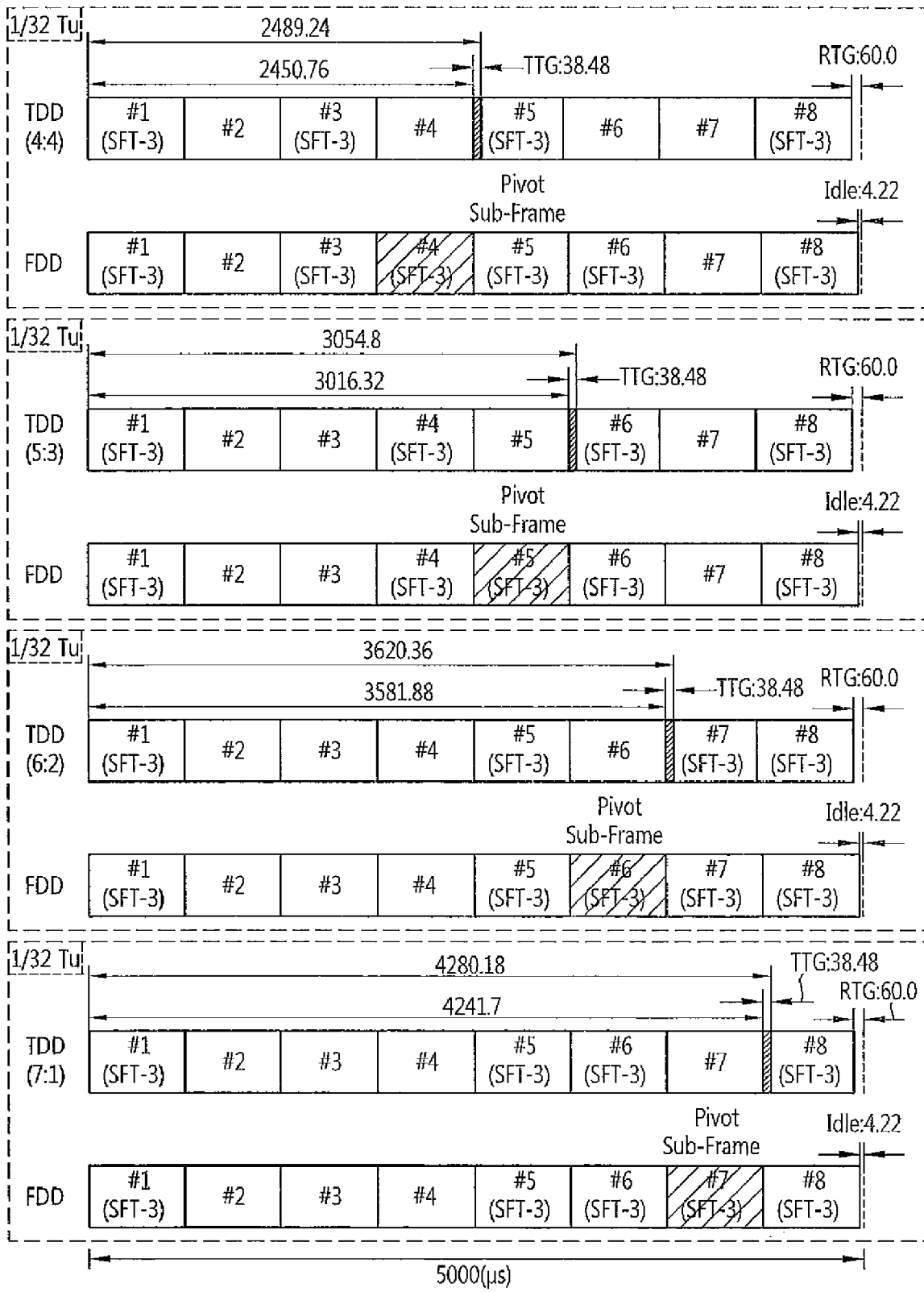
FIG. 16 shows TDD frame structures having a CP length of $1/32$ Tu and FDD frame structures having a common feature with the TDD frame structures according to an embodiment of the present invention.

FIG. 16 shows a TDD frame structure having a CP length of 1/32 Tu and an FDD frame structure having a common feature with the TDD frame structure according to an embodiment of the present invention. In FIG. 16, subframes other than the SFT-3 type subframes are SFT-1 type subframes.

Referring to FIG. 16, in a first TDD frame structure of this embodiment, a DL/UL ratio is 4:4 and a CP length is 1/32 Tu. A total frame length is 5 ms. A DL duration is a time period between a start point of a frame and a time point of 2450.76 μs, and includes 26 OFDM symbols with a CP length of 1/32 Tu. A TTG duration is a time period between the time point of 2450.76 μs and a time point of 2489.24 μs, and thus includes a time period of 38.48 μs corresponding to a portion of the idle time and the TTG duration of Table. 2. A UL duration is a time period between the time point of 2489.24 μs and a time point of 4940 μs, and includes 26 OFDM symbols with a CP length of 1/32 Tu. An RTG duration is a time period between the time point of 4940 μs and an end point of the frame, and thus includes a time period of 60 μs corresponding to the RTG duration of Table 2.

Accordingly, the DL duration consists of two SFT-3 subframes and two SFT-1 subframes, and the UL duration consists of two SFT-3 subframes and two SFT-1 subframes. In this case, there is no restriction on a subframe type arrangement within the UL duration and the DL duration.

In a second TDD frame structure of this embodiment, a DL/UL ratio is 5:3 and a CP length is 1/32 Tu. This structure is the same as the frame structure having a CP length of 1/32 Tu as shown in FIG. 10. Accordingly, a DL duration consists of two SFT-3 subframes and three SFT-1 subframes, and a UL duration consists of two SFT-3 subframes and one SFT-1 subframe. In this case, there is no restriction on a subframe type arrangement within the UL duration and the DL duration.

In a third TDD frame structure of this embodiment, a DL/UL ratio is 6:2 and a CP length is 1/32 Tu. This structure is the same as the frame structure having a CP length of 1/32 Tu as shown in FIG. 11. Accordingly, a DL duration consists of two SFT-3 subframes and four SFT-1 subframes, and a UL duration consists of two SFT-3 subframes. In this case, there is no restriction on a subframe type arrangement within the UL duration and the DL duration.

In a fourth TDD frame structure of this embodiment, a DL/UL ratio is 7:1 and a CP length is 1/32 Tu. This structure is the same as the frame structure having a CP length of 1/32 Tu as shown in FIG. 12. Accordingly, a DL duration consists of three SFT-3 subframes and four SFT-1 subframes, and a UL duration consists of one SFT-3 subframe. In this case, there is no restriction on a subframe type arrangement within the UL duration and the DL duration.

By configuring the TDD frame as described above, a DL/UL switch duration can conform to a frame structure having a CP length of 1/8 Tu. Thus, even if a system having a CP length of 1/B Tu exists in an adjacent cell, interference between uplink and downlink transmissions can be minimized.

The DL duration includes a plurality of SFT-3 type subframes. If the DL/UL ratio is 4:4, the SFT-3 type subframes can be located at two positions selected from positions #1, #2, #3, and #4. If the DL/UL ratio is 5:3, the SFT-3 type subframes can be located at two positions selected from positions #1, #2, #3, #4, and #5. If the DL/UL ratio is 6:2, the SFT-3 type subframes can be located at two positions selected from positions #1, #2, #3, #4, #5, and #6. If the DL/UL ratio is 7:1, the SFT-3 type subframes can be located at three positions selected from positions #1, #2, #3, #4, #5, #6, and #7.

In addition, the UL duration includes a plurality of SFT-3 type subframes. If the DL/UL ratio is 4:4, the SET-3 type subframes can be located at two positions selected from positions #5, #6, #7, and #8. If the DL/UL ratio is 5:3, the SFT-3 type subframes can be located at two positions selected from positions #6, #7, and #8. If the DL/UL ratio is 6:2, the SFT-3 type subframes can be located at positions #7 and #8. If the DL/UL ratio is 7:1, the SFT-3 type subframe can be located at a position #8.

If the TTG duration requires a longer duration than 38.48 μs, two OFDM symbols can be allocated to the TTG duration. For example, one of OFDM symbols of the UL duration can be further allocated for the TTG duration, and thus the TTG duration may be 132.74 μs. In this case, if the DL/UL ratio is 4:4, the SFT-3 type subframes can be located at two positions selected from #1, #2, #3, and #4 and at one position selected from positions #S, #6, #7, and #8. If the DL/UL ratio is 5:3, the SFT-3 type subframes can be located at two positions selected from positions #1, #2, #3, #4, and #5 and at one position selected from positions #6, #7, and #8. If the DL/UL ratio is 6:2, the SFT-3 type subframes can be located at two positions selected from #1, #2, #3, #4, #5, and #6 and at one position selected from positions #7 and #8. If the DL/UL ratio is 7:1, the SFT-3 type subframes can be located at two positions selected from positions #1, #2, #3, #4, #5, #6, and #7 and at a position #8.

Next, in the FDD frame structure, the FDD frame includes one pivot subframe. As shown in FIG. 16, the pivot subframe may be an SFT-3 type subframe. The pivot subframe may be located at a position corresponding to a TTG duration of the TDD frame. That is, if the DL/UL ratio is 4:4, the TTG duration in the TDD frame is located between positions #4 and #5, and thus the pivot subframe in the FDD frame can be located at a position #4 or #5. If the DL/UL ratio is 5:3, the TTG duration in the TDD frame is located between positions #5 and #6, and thus the pivot subframe in the FDD frame can be located at a position #5 or #6. If the DL/UL ratio is 6:2, the TTG duration in the TDD frame is located between positions #6 and #7, and thus the pivot subframe in the FDD frame can be located at a position #6 or #7. However, since the UL duration includes two SFT-3 type subframes, the pivot subframe is preferably located at the position #6. If the DL/UL ratio is 7:1, the TTG duration in the TDD frame is located between positions #7 and #8, and thus the pivot subframe in the FDD frame can be located at a position #7 or #8. However, since the UL duration includes one SFT-3 type subframe, the pivot subframe is preferably located at the position #7.

To maintain the common feature with the TDD frame, two SFT-3 type subframes are located ahead of the pivot subframe, and two SFT-3 type subframes are located behind of the pivot subframe. That is, if the DL/UL ratio is 4:4, when the pivot subframe is located at a position #4, the SFT-3 type subframes other than the pivot subframe can be located at two positions selected from positions #1, #2, and #3 and at two positions selected from positions #5, #6, #7, and #8, or when the pivot subframe is located at the position #5, the SFT-3 type subframes can be located at two positions selected from positions #1, #2, #3, and #4 and at two positions selected from positions #6, #7, and #8. If the DL/UL ratio is 5:3, when the pivot subframe is located at a position #5, the SFT-3 type subframes other than the pivot subframe can be located at two positions selected from positions #1, #2, #3, and #4 and at two positions selected from positions #6, #7, and #8 or when the pivot subframe is located at the position #6, the SFT-3 type subframes can be located at two positions selected from positions #1, #2, #3, #4, and #5 and at positions #7 and #8. If the DL/UL ratio is 6:2, when the pivot subframe is located at a position #6, the SFT-3 type subframes other than the pivot subframe can be located at two positions selected from positions #1, #2, #3, #4, and #5 and at positions #7 and #8, or when the pivot subframe is located at the position #7, the SFT-3 type subframes can be located at three positions selected from positions #1, #2, #3, #4, #5, and #6 and at a position #8. If the DL/UL ratio is 6:2, when the pivot subframe is located at a position #7, the SFT-3 type subframes other than the pivot subframe can be located at three positions selected from positions #1, #2, #3, #4, #5, and #6 and at a position #8, or when the pivot subframe is located at the position #8, the SFT-3 type subframes can be located at four positions selected from positions #1, #2, #3, #4, #5, #6, and #7.

In FIG. 16, the pivot subframe is only located in #4, #5, #6, and #7. But this is for exemplary purposes only. The other FDD frame with different locations of the pivot subframe may be considered in the same way.

When the TDD frame is configured as shown in FIG. 13 to FIG. 16, mutual interference does not occur even if the frame structures having different CP lengths exist in adjacent cells. That is, mutual interference does not occur since a DL duration of a frame having a CP length of 1/8 Tu does not overlap with a UL duration of a frame having a CP length of 1/4 Tu, 1/16 Tu, or 1/32 Tu, and a UL duration of a frame having a CP length of 1/8 Tu does not overlap with a DL duration of a frame having a CP length of 1/4 Tu, 1/16 Tu, or 1/32 Tu.

Since the FDD frame configured as shown in FIG. 13 to FIG. 16 has a common feature with the corresponding TDD frame, an algorithm used in a TDD system or a related communication algorithm (i.e., resource allocation) can be reused in an FDD system.

Table 4 below summarizes some of the features of FIGS. 13-16 and shows a characteristic of a TDD frame structure according to an embodiment of the present invention.

TABLE 4

| Parameters | Values or Features DL/UL Ratio with a CP of 1/8 Tu | | | | | | | | | |
|---|---|---|---|---|---|---|---|---|---|---|
| | 5:3 | 6:2 | 7:1 | 4:4 | 5:3 | 6:2 | 7:1 | 5:3 | 6:2 | 7:1 |
| CP lengths(μs) | 1/4 Tu | | | 1/16 Tu | | | | 1/32 Tu | | |
| | TDD | | | | | | | | | |
| No. of SFT-1 Subframes | 5 | | | 6 | | | | 4 | | |
| No. of SFT-2 and SFT-3 Subframes | 2 | | | 2 | | | | 4 | | |
| Positions of SFT-1 Subframes | Any position that avoids the positions of SFT-2 and SFT-3 Subframes | | | Any position that avoids the positions of SFT-2 and SFT-3 Subframes | | | | Any position that avoids the positions of SFT-2 and SFT-3 Subframes | | |
| Positions of SFT-2 Subframes | #5 | #6 | #7 | N/A | N/A | N/A | N/A | N/A | N/A | N/A |
| Positions of SFT-3 Subframes | One among #1, #2, #3 and #4 | One among #1, #2, #3, #4 and #5 | One among #1, #2, #3, #4, #5 and #6 | One among #1, #2, #3 and #4 + One among #5, #6, #7 and #8 | One among #1, #2, #3, #4 and #5 + One among #6, #7 and #8 | One among #1, #2, #3, #4, #5 and #6 + One among #7 and #8 | One among #1, #2, #3, #4, #5, #6 and #7 + #8 | Two among #1, #2, #3, #4 and #5 + Two among #6, #7 and #8 | Two among #1, #2, #3, #4, #5 and #6 + #7 and #8 | Two among #1, #2, #3, #4, #5, #6 and #7 + #8 |

Table 5 below summarizes features of FIGS. 13-16 and shows a characteristic of a TDD frame having a structure in which a CP length is 1/4 Tu and a base subframe is constructed of an SFT-2 type subframe according to an embodiment of the present invention.

TABLE 5

| Parameters | Value or Features DL/UL Ratio with a CP of 1/8 Tu | | | |
|---|---|---|---|---|
| | 4:4 | 5:3 | 6:2 | 7:1 |
| CP lengths(μs) | 1/4 Tu | | | |
| No. of SFT-1 Subframes | 2 | | | |
| No. of SFT-2 and SFT-3 Subframes | 6 | | | |
| Positions of SFT-1 Subframes | One among #1, #2, #3 and #4 + One among #5, #6, #7 and #8 | One among #1, #2, #3, #4 and #5 + One among #6, #7 and #8 | One among #1, #2, #3, #4, #5 and #6 + One among #7 and #8 | One among #1, #2, #3, #4, #5, #6 and #7 + #8 |
| Positions of SFT-2 Subframes | Any position that avoids the positions of SFT-1 and SFT-3 Subframes | | | |
| Positions of SFT-3 Subframes | N/A | | | |

Table 6 below summarizes features of FIGS. 13-16 and shows a characteristic of a TDD frame having a structure in which a CP length is 1/32 Tu and two OFDM symbols are allocated to a TTG duration according to an embodiment of the present invention.

TABLE 6

| Parameters | Values or Features DL/UL Ratio with a CP of ⅛ Tu | | | |
|---|---|---|---|---|
| | 4:4 | 5:3 | 6:2 | 7:1 |
| CP lengths(μs) | ¹⁄₃₂TU | | | |
| No. of SFT-1 Subframes | 5 | | | |
| No. of SFT-2 and SFT-3 Subframes | 3 | | | |
| Positions of SFT-1 Subframes | Any position that avoids the positions of SFT-2 and SFT-3 Subframes | | | |
| Positions of SFT-2 Subframes | N/A | | | |
| Positions of SFT-3 Subframes | Two among #1, #2, #3 and #4 + One among #5, #6, #7 and #8 | Two among #1, #2, #3, #4 and #5 + One among #6, #7 and #8 | Two among #1, #2, #3, #4, #5 and #6 + One among #7 and #8 | Two among #1, #2, #3, #4, #5, #6 and #7 + #8 |

Table 7 below summarizes additional features of FIGS. 13-16 and shows a characteristic of an FDD frame structure according to an embodiment of the present invention.

TABLE 7

| Parameters | Values or Features DL/UL Ratio with a CP of ⅛Tu | | | | | | | | |
|---|---|---|---|---|---|---|---|---|---|
| | 5:3 | 6:2 | 7:1 | 4:4 | 5:3 | 6:2 | 7:1 | 5:3 | 6:2 | 7:1 |
| CP lengths (μs) | | ¼Tu | | | ¹⁄₁₆Tu | | | | ¹⁄₃₂Tu | |
| | | | | FDD | | | | | | |
| No. of SFT-1 Subframes | | 6 | | | 5 | | | | 3 | |
| No. of SFT-2 and SFT-3 | | 1 | | | 3 | | | | 4 | |
| Type of Pivot Subframes | | SFT-1 | | | SFT-3 | | | | SFT-3 | |
| Positions of Pivot Subframe (Option 1) | #5 | #6 | #7 | #4 | #5 | #6 | #7 | #5 | #6 | #7 |
| Positions of Pivot Subframe (Option 2) | | | | #5 | #6 | #7 | | #6 | | |
| Positions of SFT-1 Subframes | Any position that avoids the positions Of SFT-2 and SFT-3 Subframes | | | | Except the positions of SFT-2 and SFT-3 Subframes | | | Except the positions of SFT-2 and SFT-3 Subframes | | |
| Positions of SFT-2 Subframes | N/A | N/A | N/A | N/A | N/A | N/A | N/A | N/A | N/A | N/A |
| Positions of SFT-3 Subframes for Option 1 | One among #1, #2, #3 and #4 | One among #1, #2, #3, #4 and #5 | One among #1, #2, #3, #4 and #5 | One among #1, #2 and #3 + One among #5, #6, #7 and #8 | One among #1, #2, #3, and #4 + One among #6, #7 and #8 | One among #1, #2, #3, #4 and #5 + One among #7 and #8 | One among #1, #2, #3, #4, #5 and #6 + #8 | Two among #1, #2, #3 and #4 + Two among #6, #7 and #8 | Two among #1, #2, #3, #4 and #5 + #7 and #8 | Three among #1, #2, #3, #4, #5 and #6 + #8 |
| Positions of SFT-3 Subframes for Option 2 | Same as Option 1 | Same as Option 1 | Same as Option 1 | One among #1, #2, #3 and #4 + One among #6, #7 and #8 | One among #1, #2, #3, #4 and #5 + One among #7 and #8 | One among #1, #2, #3, #4, #5 and #6 + #8 | Same as Option 1 | Two among #1, #2, #3, #4 and #5 + #7 and #8 | Same as Option 1 | Same as Option 1 |

Table 8 below summarizes additional features of FIGS. 13-16 and shows a characteristic of an FDD frame having a structure in which a CP length is ¼ Tu and a base subframe is constructed of an SFT-2 type subframe according to an embodiment of the present invention.

TABLE 8

| Parameters | Values or Features DL/UL Ratio with a CP of ⅛ Tu | | | |
|---|---|---|---|---|
| | 4:4 | 5:3 | 6:2 | 7:1 |
| CP lengths(μs) | | ¼Tu | | |
| No. of SFT-1 Subframes | | 3 | | |
| No. of SFT-2 and SFT-3 Subframes | | 5 | | |
| Type of Pivot Subframe | | SFT-1 | | |
| Positions of Pivot Subframes (Option 1) | #4 | #5 | #6 | #7 |
| Positions of Pivot Subframes (Option 2) | #5 | #6 | #7 | |
| Positions of SFT-1 Subframes | Any position that avoids the positions of SFT-2 and SFT-3 Subframes | | | |
| Positions of SFT-2 Subframes (Option 1) | Two among #1, #2 and #3 + Three among #5, #6, #7 and #8 | Three among #1, #2, #3 and #4 + Two among #6, #7 and #8 | Four among #1, #2, #3, #4 and #5 + One among #7 and #8 | Five among #1, #2, #3, #4, #5 and #6 |
| Positions of SFT-2 Subframes (Option 2) | Three among #1, #2, #3 and #4 + Two among #6, #7 and #8 | Four among #1, #2, #3, #4 and #5 + One among #7 and #8 | Five among #1, #2, #3, #4, #5 and #6 | |
| Positions of SFT-3 Subframes | N/A | N/A | N/A | N/A |

Table 9 below summarizes additional features of FIGS. 13-15 and shows a characteristic of an FDD frame having a structure in which a CP length is 1/32 Tu and two OFDM symbols are allocated to a TTG duration according to an embodiment of the present invention.

TABLE 9

| Parameters | Values or Features DL/UL Ratio with a CP of ⅛ Tu | | | |
|---|---|---|---|---|
| | 4:4 | 5:3 | 6:2 | 7:1 |
| CP lengths(μs) | | 1/32TU | | |
| No. of SFT-1 Subframes | | 4 | | |
| No. of SFT-2 and SFT-3 Subframes | | 4 | | |
| Type of Pivot Subframe | | SFT-3 | | |
| Positions of Pivot Subframes (Option 1) | #5 | #6 | #7 | #8 |
| Positions of Pivot Subframes (Option 2) | | | | |

TABLE 9-continued

| | Values or Features | | | |
| | DL/UL Ratio with a CP of ⅛ Tu | | | |
| Parameters | 4:4 | 5:3 | 6:2 | 7:1 |
|---|---|---|---|---|
| Positions of SFT-1 Subframes | Any position that avoids the positions of SFT-2 and SFT-3 Subframes | | | |
| Positions of SFT-2 Subframes | N/A | | | |
| Positions of SFT-3 Subframes (Option 1) | Two among #1, #2, #3 and #4 + One among #6, #7 and #8 | Two among #1, #2, #3, #4 and #5 + One among #7 and #8 | Two among #1, #2, #3, #4, #5 and #6 + #8 | Three among #1, #2, #3, #4, #5, #6 and #7 |
| Positions of SFT-3 Subframes (Option 2) | Same as Option 1 | Same as Option 1 | Same as Option 1 | Same as Option 1 |

Figure 17:
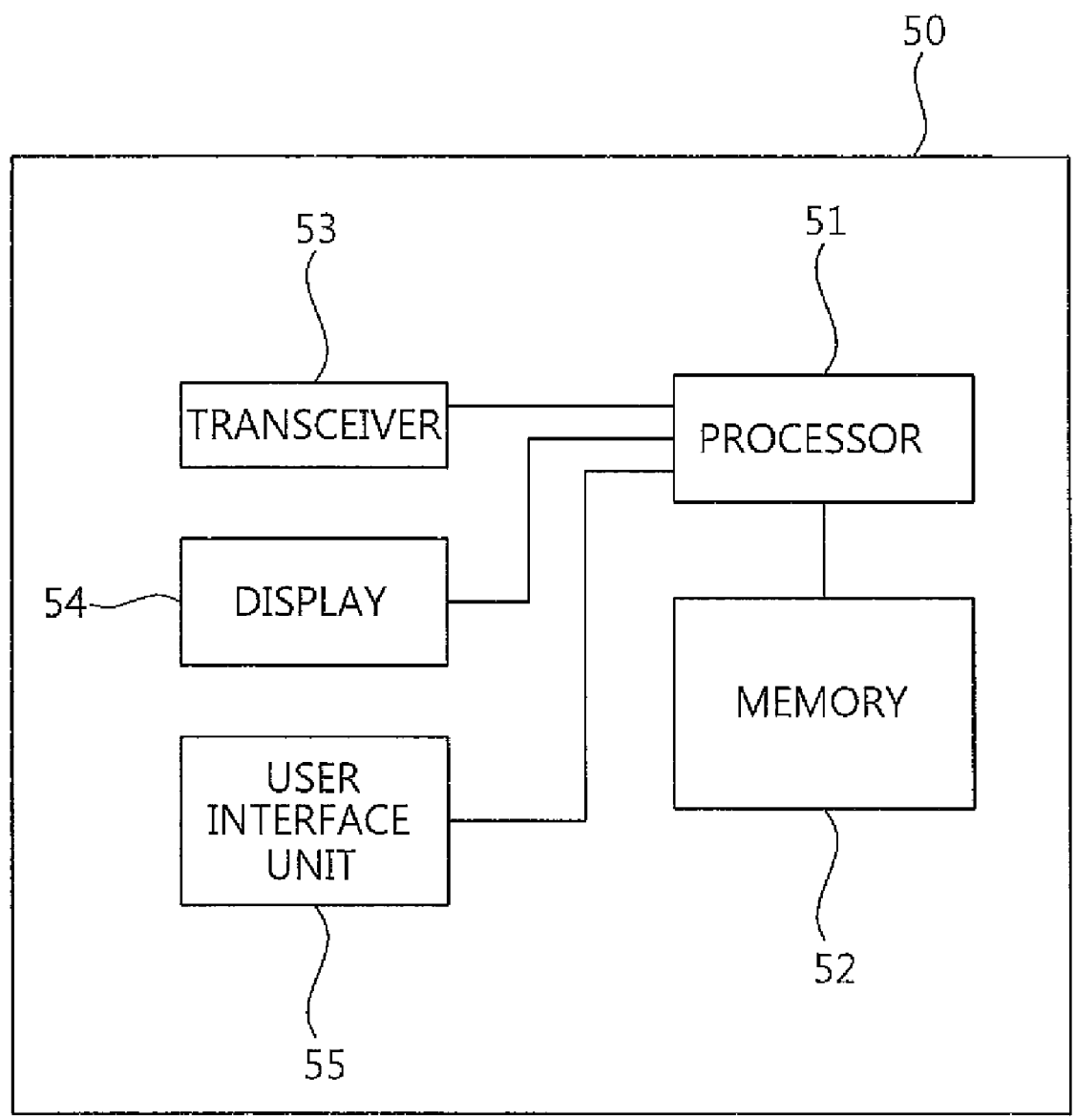
FIG. 17 is a block diagram showing an apparatus of wireless communication.

FIG. 17 is a block diagram showing an apparatus of wireless communication that may be used with the previously described embodiments. An apparatus 50 may be a part of UE. The apparatus 50 includes a processor 51, a memory 52, a transceiver 53, a display 54, and a user interface unit 55. The processor 51 may be configured to configure at least one subframe in a frame. The frame may be constructed by the proposed schemes. The memory 52 is coupled with the processor 51 and stores a variety of information to configure the at least one subframe in the frame. The display 54 displays a variety of information of the UE 50 and may use a well-known element such as a liquid crystal display (LCD), an organic light emitting diode (OLED), etc. The user interface unit 55 can be configured with a combination of well-known user interfaces such as a keypad, a touch screen, etc. The transceiver 53 is coupled with the processor 51 and transmits and/or receives a subframe in the frame.

According to the present invention, when frame structures having various cyclic prefix (CP) lengths and supporting an Institute of Electrical and Electronics Engineers (IEEE) 802.16m format coexist in adjacent cells, mutual interference can be mitigated in data transmission. The entire contents of IEEE 802.16m is incorporated herein by reference.

In addition, by providing a frequency division duplexing (FDD) frame structure having a common feature with a time division duplexing (TDD) frame structure, an algorithm used in a TDD system or a related communication algorithm (i.e., resource allocation) can be reused in an FDD system.

The present invention can be implemented with hardware, software, or combination thereof. In hardware implementation, the present invention can be implemented with one of an application specific integrated circuit (ASIC), a digital signal processor (DSP), a programmable logic device (PLD), a field programmable gate array (FPGA), a processor, a controller, a microprocessor, other electronic units, and combination thereof, which are designed to perform the aforementioned functions. In software implementation, the present invention can be implemented with a module for performing the aforementioned functions. Software is storable in a memory unit and executed by the processor. Various means widely known to those skilled in the art can be used as the memory unit or the processor.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of communicating by a mobile communication terminal in communication with a base station, comprising:
   transceiving data in a unit of a frame in which five (5) subframes for downlink which are followed by three (3) subframes for uplink are included, the frame including
      a plurality of first type subframes each having a first number of orthogonal frequency division multiple access (OFDMA) symbols, and
      a plurality of second type subframes each having a second number of OFDMA symbols different from the first number,
   wherein one (1) first type subframe for downlink is followed by three (3) second type subframes for downlink, and two (2) second type subframes for uplink are followed by one (1) first type subframe for uplink, which is a last subframe of the frame, and
   wherein an idle symbol is included between the five (5) subframes for downlink and the three (3) subframes for uplink.

2. The method of claim 1, wherein a number of the plurality of first type subframes and a number of the plurality of second type subframes are predetermined.

3. The method of claim 1, wherein a number of the plurality of first type subframes and a number of the plurality of second type subframes are determined based upon an instruction received from the base station.

4. The method of claim 1, wherein the frame has a cyclic prefix (CP) length of 1/16 useful symbol time (Tu).

5. The method of claim 1, wherein the last subframe of the frame includes an additional idle symbol for a receive/transmit transition gap (RTG).

6. A mobile communication terminal configured to communicate with a base station, comprising:
   a transceiver; and
   a processor operatively connected to the transceiver, the processor configured to transceive data in a unit of a frame in which five (5) subframes for downlink which are followed by three (3) subframes for uplink are included, the frame including a plurality of first type subframes each having a first number of orthogonal frequency division multiple access (OFDMA) symbols, and a plurality of second type subframes each having a second number of OFDMA symbols different from the first number, wherein one (1) first type subframe for downlink is followed by three (3) second type subframes for downlink, and two (2) second type subframes for uplink are followed by one (1) first type subframe for uplink, which is a last subframe of the frame, and wherein an idle symbol is included between the five (5) subframes for downlink and the three (3) subframes for uplink.

7. The terminal of claim 6, wherein a number of the plurality of first type subframes and a number of the plurality of second type subframes are predetermined.

8. The terminal of claim 6, wherein a number of the plurality of first type subframes and a number of the plurality of second type subframes are determined based upon an instruction received from the base station.

9. The terminal of claim 6, wherein the frame has a cyclic prefix (CP) length of $1/16$ useful symbol time (Tu).

10. The terminal of claim 6, wherein the last subframe of the frame includes an additional idle symbol for a receive/transmit transition gap (RTG).

* * * * *